United States Patent
Jeong

(10) Patent No.: US 10,055,835 B2
(45) Date of Patent: Aug. 21, 2018

(54) INSPECTION APPARATUS FOR WELDING TIP OF SPOT WELDING GUN AND ANALYSIS METHOD FOR POLLUTION AND ARRAY OF WELDING TIP USING THE SAME

(71) Applicant: AUTOIT CO., LTD, Seoul (KR)

(72) Inventor: Myung Hwan Jeong, Gwacheon-si (KR)

(73) Assignee: AUTOIT CO., LTD, Seoul (KR)

( * ) Notice: Subject to any disclaimer, the term of this patent is extended or adjusted under 35 U.S.C. 154(b) by 121 days.

(21) Appl. No.: 14/894,532

(22) PCT Filed: Aug. 20, 2015

(86) PCT No.: PCT/KR2015/008725
§ 371 (c)(1),
(2) Date: Jan. 27, 2016

(87) PCT Pub. No.: WO2016/088984
PCT Pub. Date: Jun. 9, 2016

(65) Prior Publication Data
US 2016/0171681 A1  Jun. 16, 2016

(30) Foreign Application Priority Data

Dec. 1, 2014 (KR) .................. 10-2014-0169490
Dec. 1, 2014 (KR) .................. 10-2014-0169492
(Continued)

(51) Int. Cl.
*G06K 9/00* (2006.01)
*G06T 7/00* (2017.01)
(Continued)

(52) U.S. Cl.
CPC .......... *G06T 7/001* (2013.01); *B23K 11/3063* (2013.01); *G06T 7/64* (2017.01);
(Continued)

(58) Field of Classification Search
None
See application file for complete search history.

(56) References Cited

U.S. PATENT DOCUMENTS 6,281,465 B1 * 8/2001 Muller .................. B23K 11/115
219/109
8,779,320 B2 * 7/2014 Watanabe ............ B23K 11/256
219/55
(Continued)

OTHER PUBLICATIONS

Son et al. (KR 10-2013-0104365), translation attached.*
Yamane et al. (JP 2012-187588), translation attached.*

*Primary Examiner* — Soo Park
(74) *Attorney, Agent, or Firm* — Hauptman Ham, LLP

(57) ABSTRACT

The present invention discloses methods and apparatus for increasing inspection efficiency and reducing time for analyzing an image when inspecting contamination and alignment of the welding tip of the spot welding gun. An apparatus for inspecting a welding tip according to some embodiments of the present invention is configured to inspect the contamination and the alignment of the welding tip based on an end-surface image and a profile image of the welding tip. In particular, when recording the welding tip through an internal housing arranged in an internal space of an external housing, the noise generated from an external light source can be blocked, and hence the contamination and the alignment of the welding tip can be inspected by using a clearer image, thus improving the accuracy of the inspection.

15 Claims, 14 Drawing Sheets

(30) Foreign Application Priority Data

| Apr. 15, 2015 | (KR) | 10-2015-0053299 |
| May 6, 2015 | (KR) | 10-2015-0062850 |
| Aug. 19, 2015 | (KR) | 10-2015-0116864 |

(51) Int. Cl.
*B23K 11/30* (2006.01)
*G06T 7/64* (2017.01)

(52) U.S. Cl.
CPC .............. *G06T 2207/30136* (2013.01); *G06T 2207/30164* (2013.01)

(56) References Cited

U.S. PATENT DOCUMENTS

| 8,901,449 | B2 * | 12/2014 | Takayama | B23K 11/115 219/86.1 |
| 8,953,033 | B2 * | 2/2015 | Yamane | G01B 11/08 348/90 |
| 9,497,360 | B2 * | 11/2016 | Sogo | B23K 11/36 |
| 9,662,739 | B2 * | 5/2017 | Aoki | B23K 11/115 |
| 2009/0289040 | A1 * | 11/2009 | Boyd | B23K 11/11 219/86.41 |
| 2012/0236318 | A1 * | 9/2012 | Aoki | G01B 11/245 356/613 |

* cited by examiner

[Fig. 1]
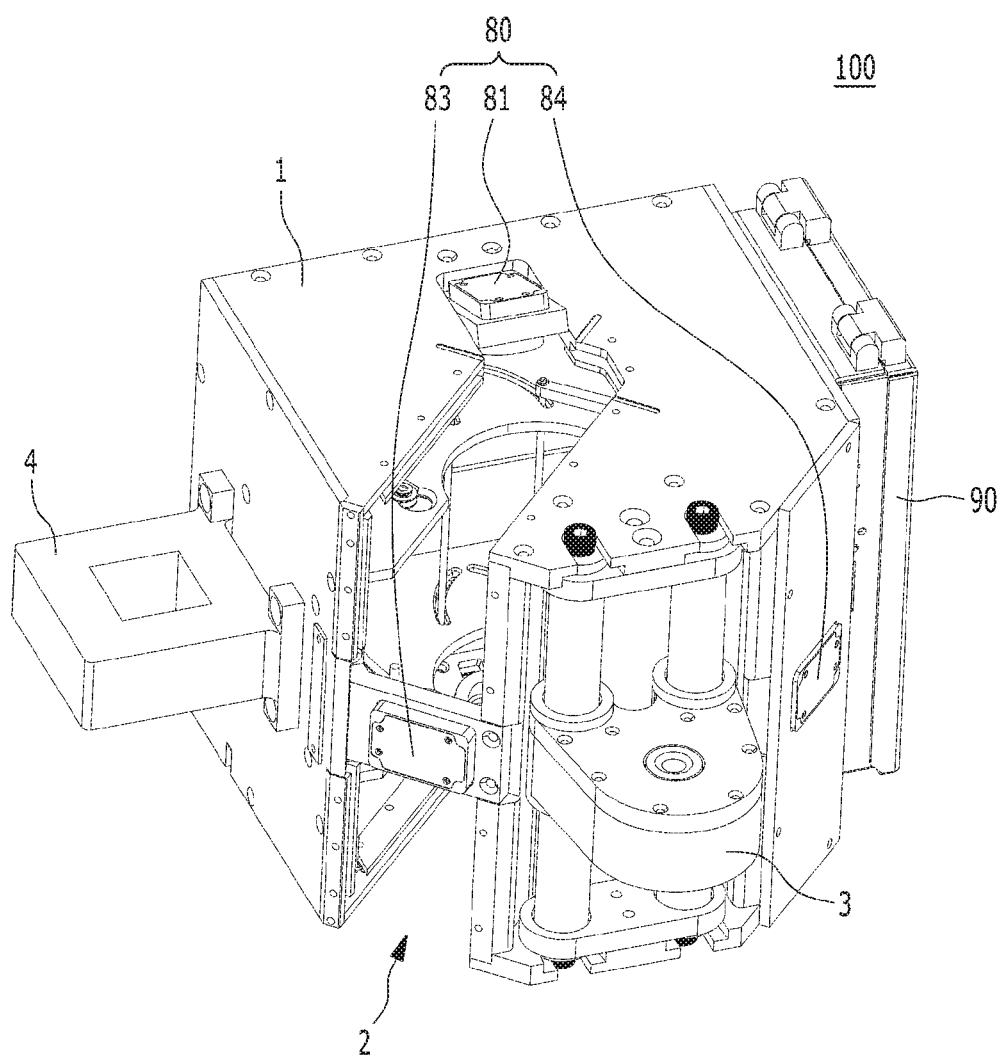

[Fig. 2]
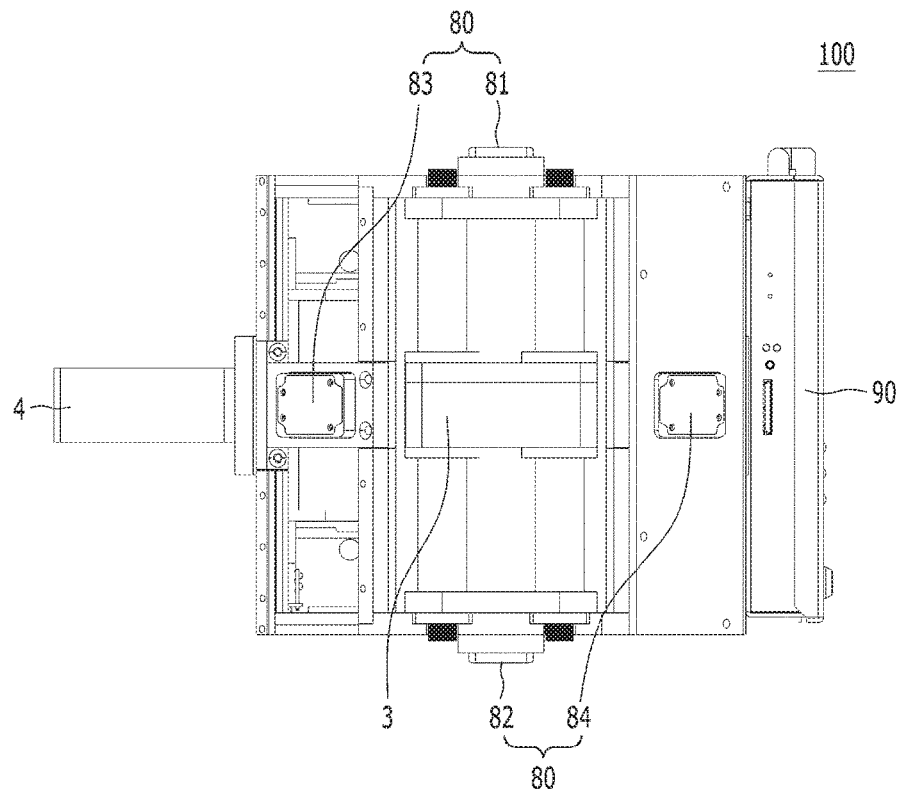
[Fig. 3]
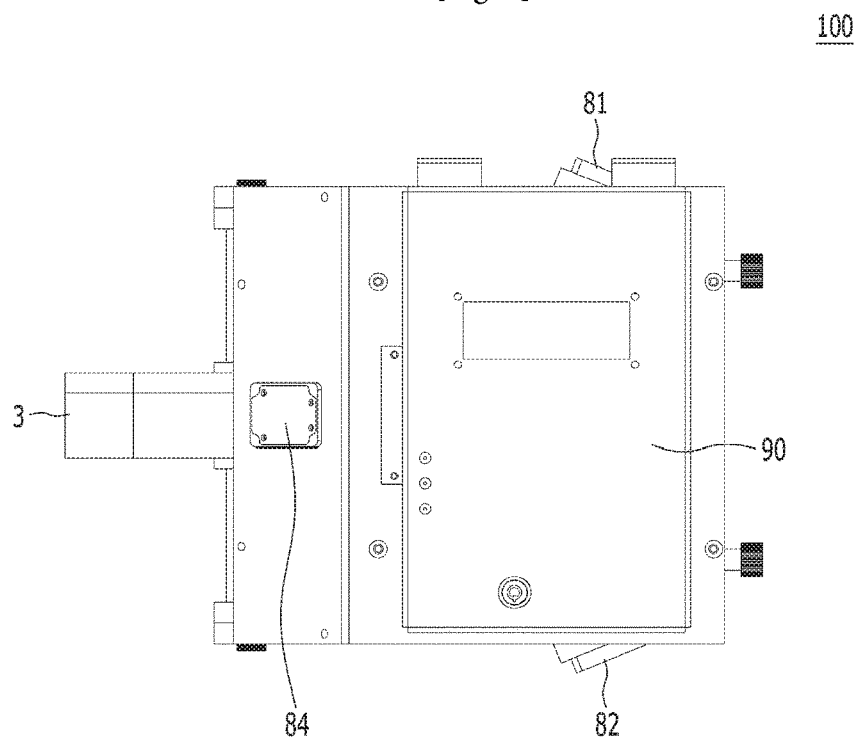

[Fig. 4]
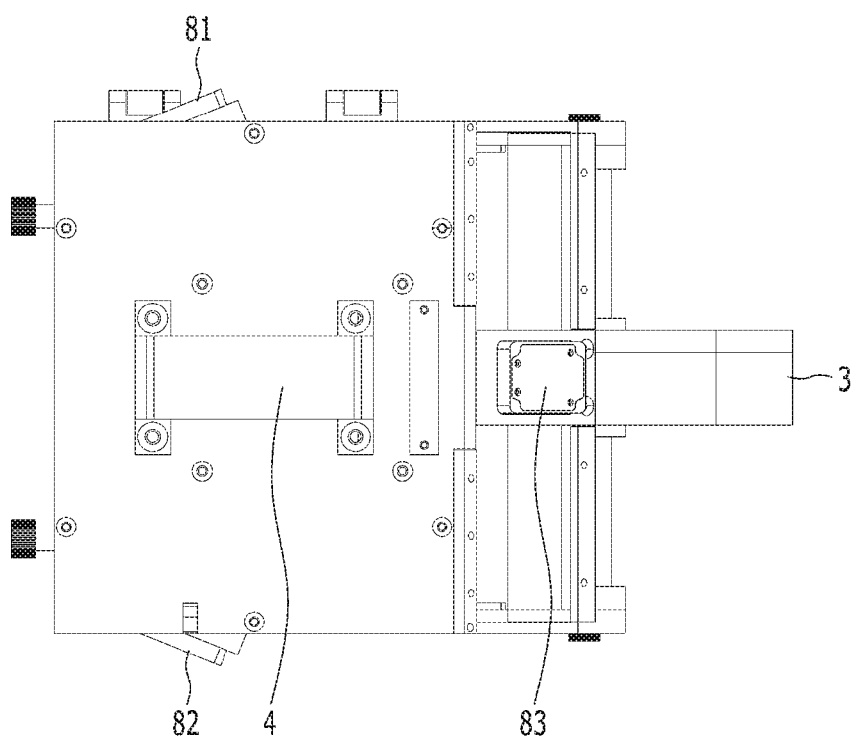

[Fig. 5]
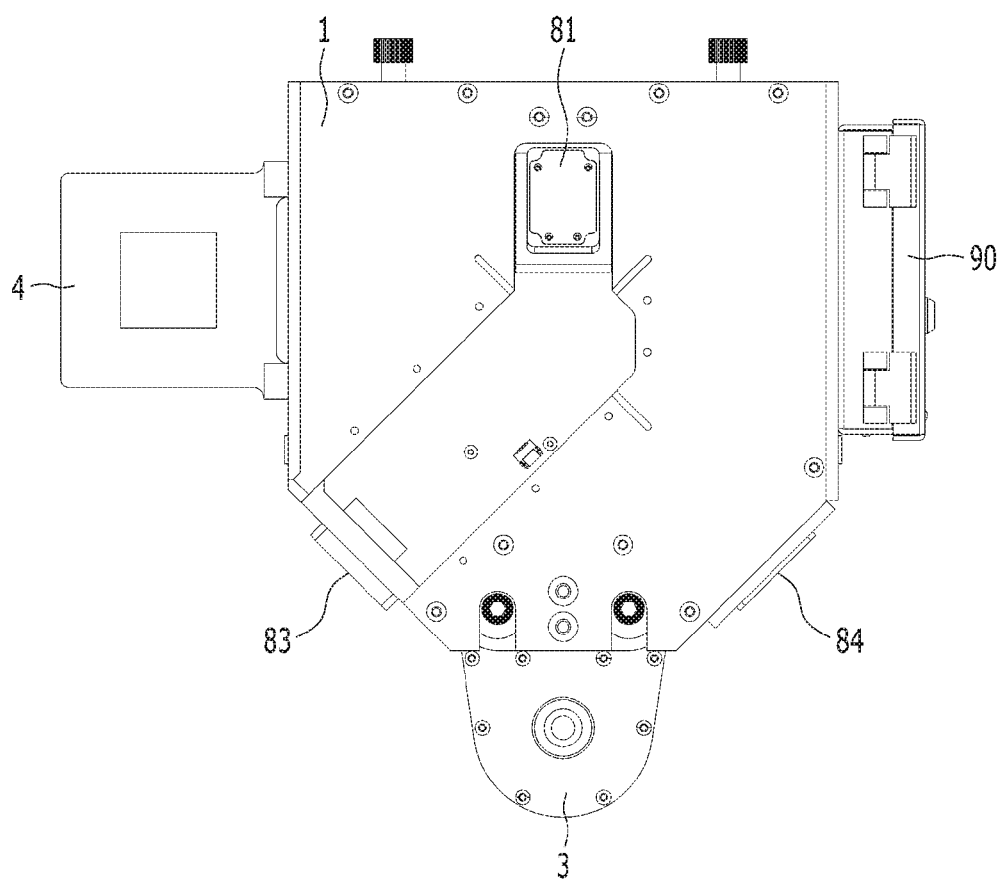

[Fig. 6]
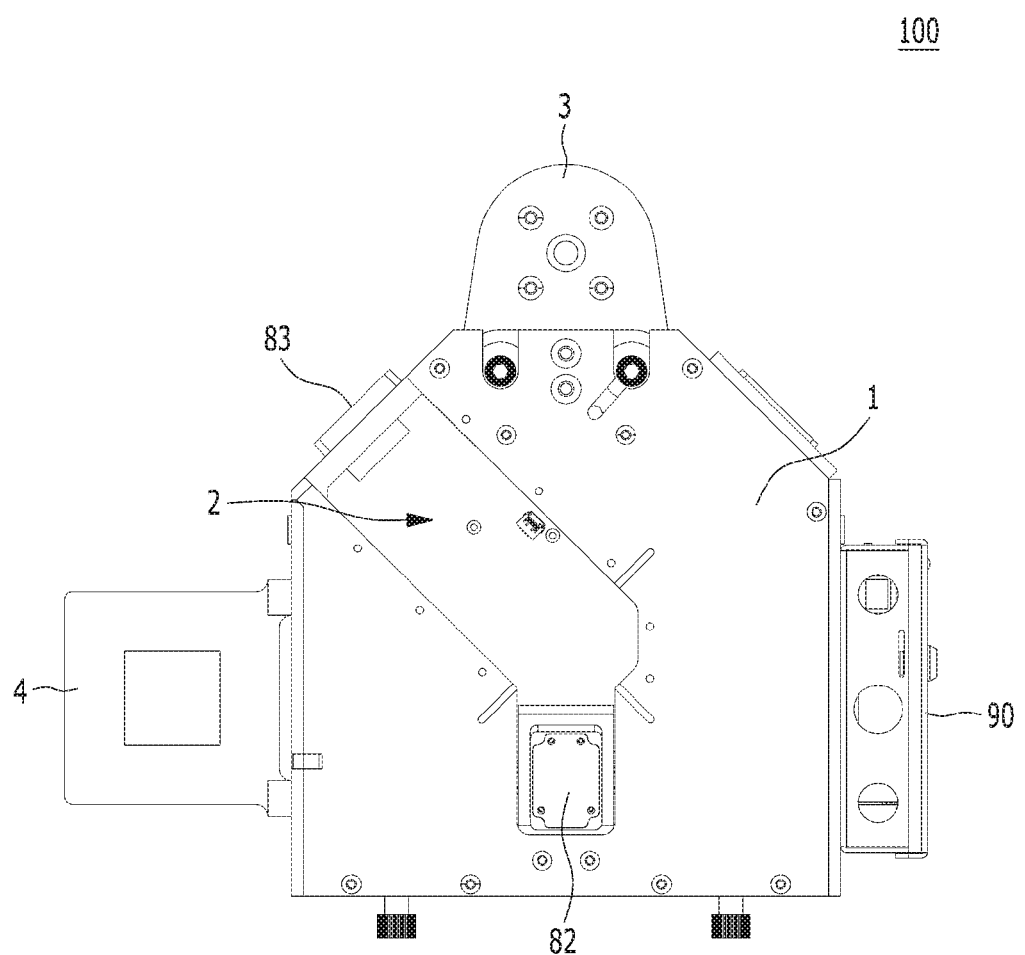

[Fig. 7]
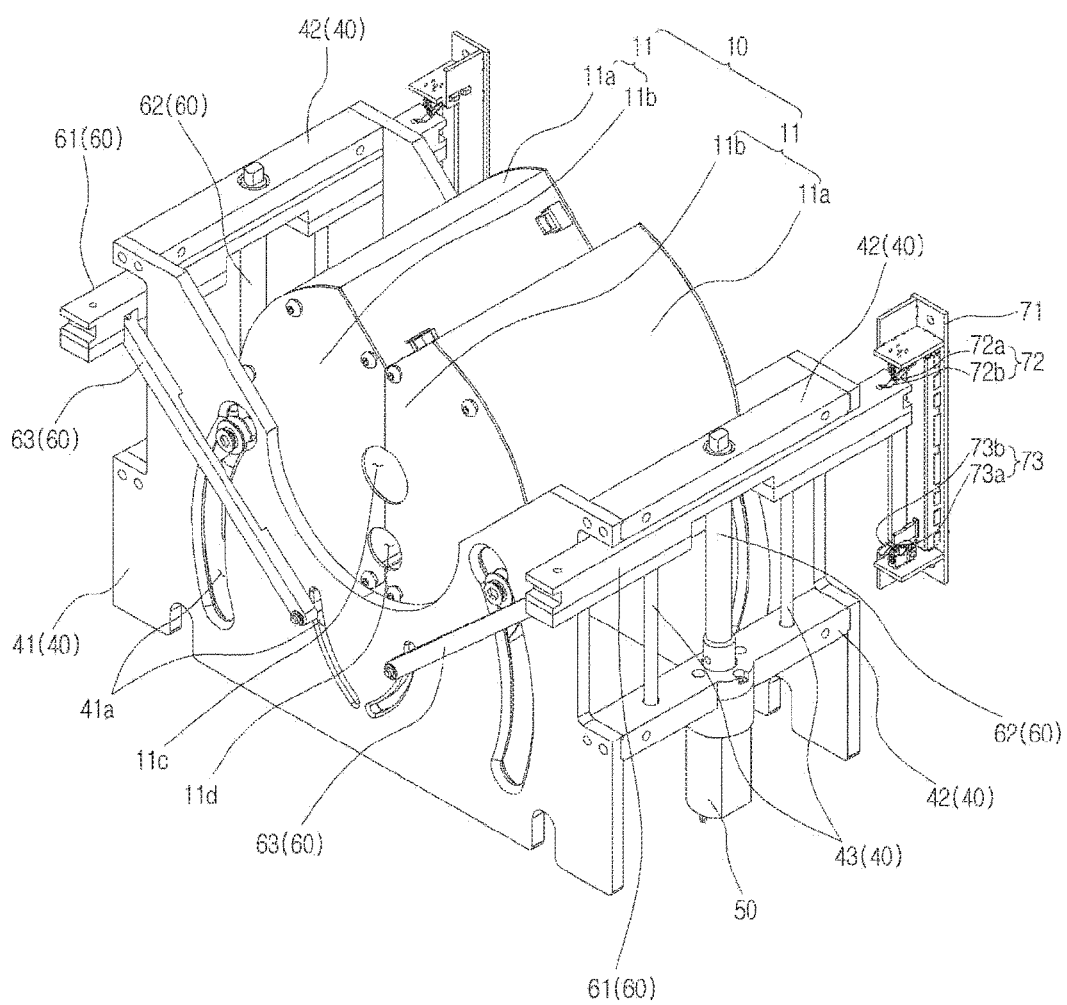

[Fig. 8]
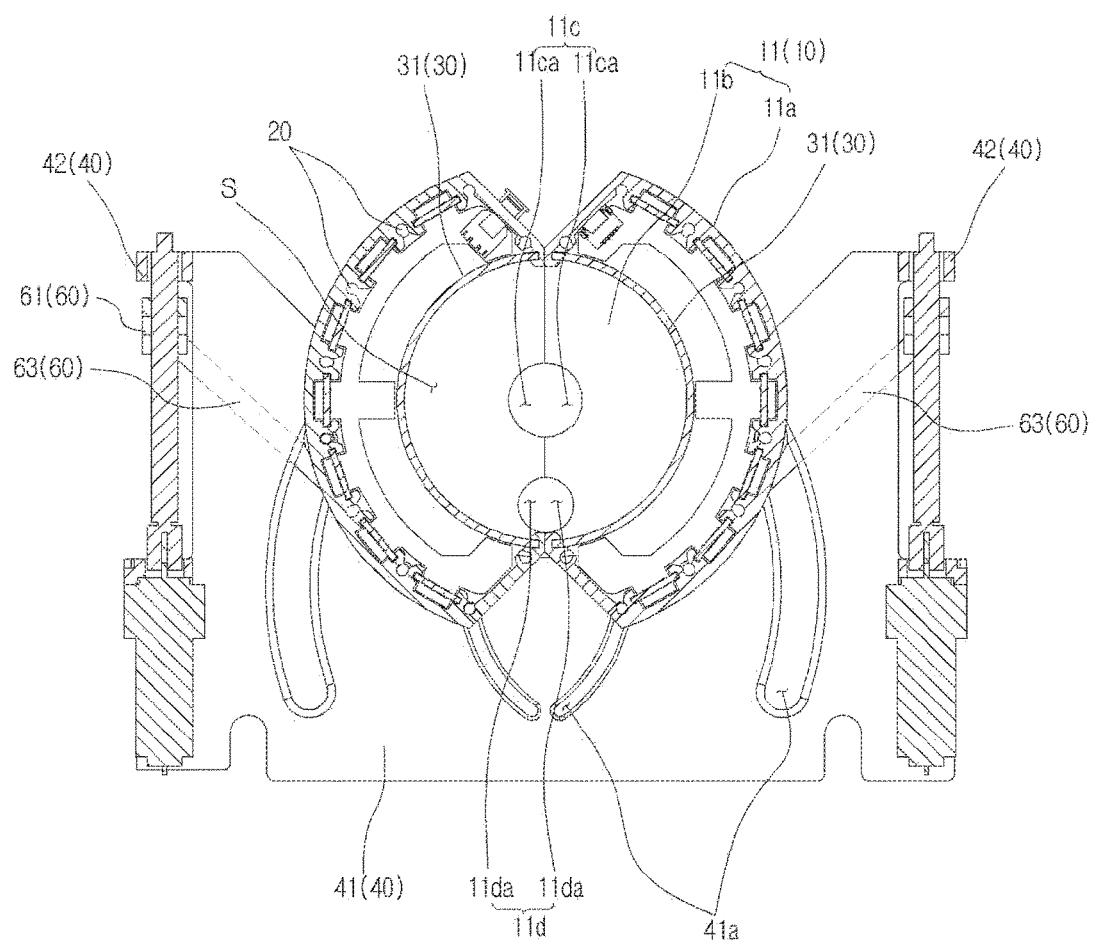

[Fig. 9]
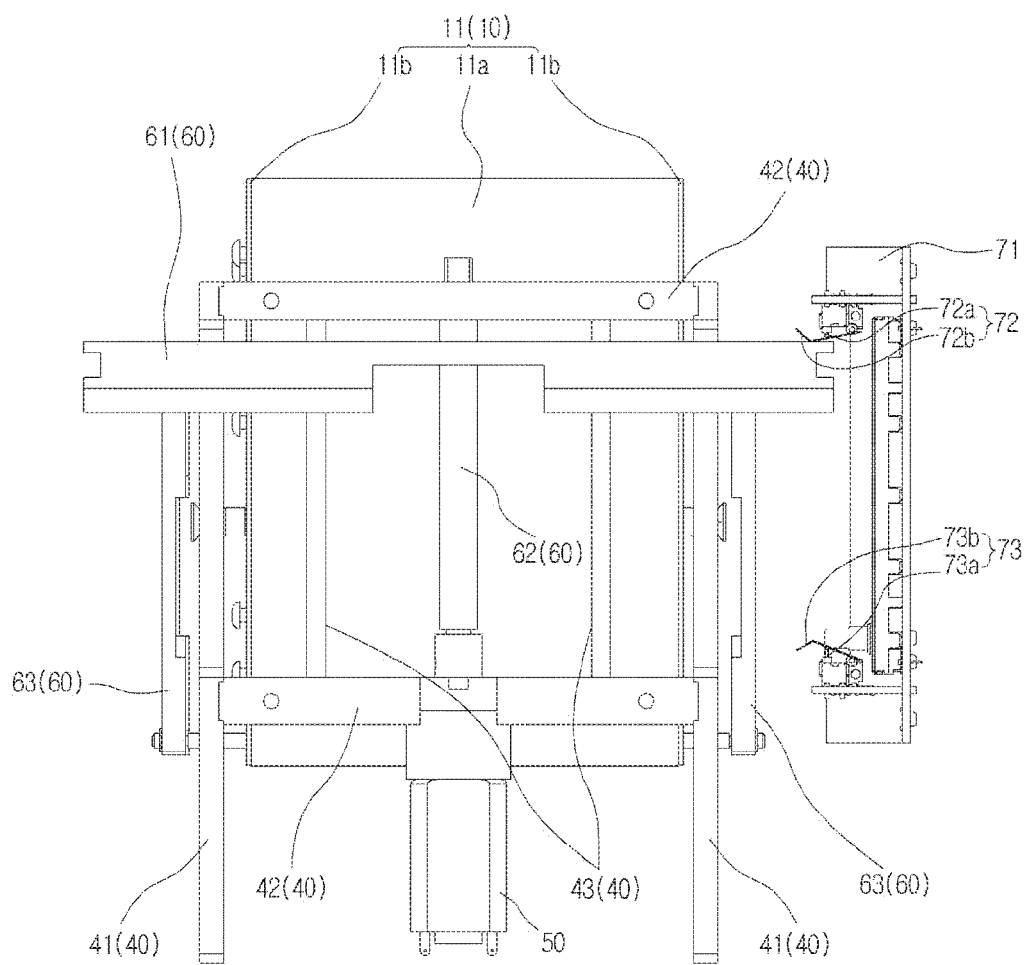

[Fig. 10]
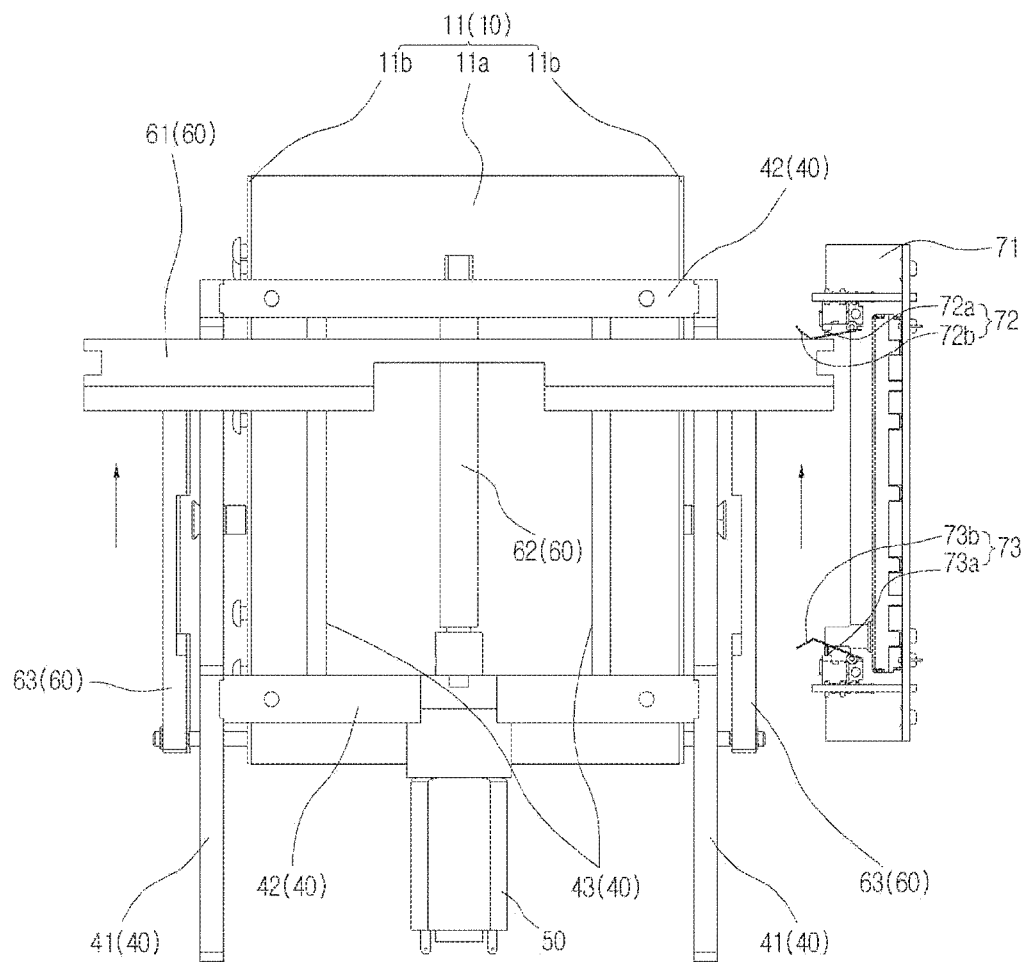

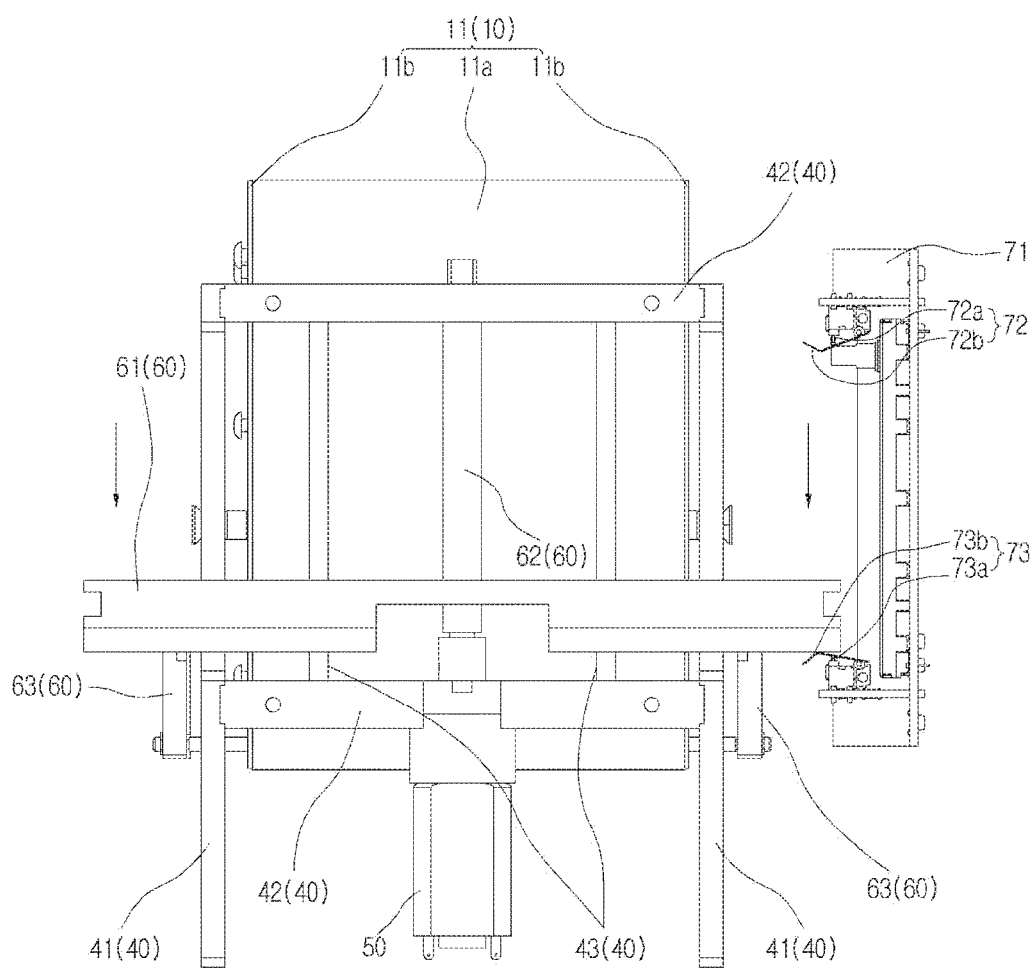
[Fig. 11]

[Fig. 12]
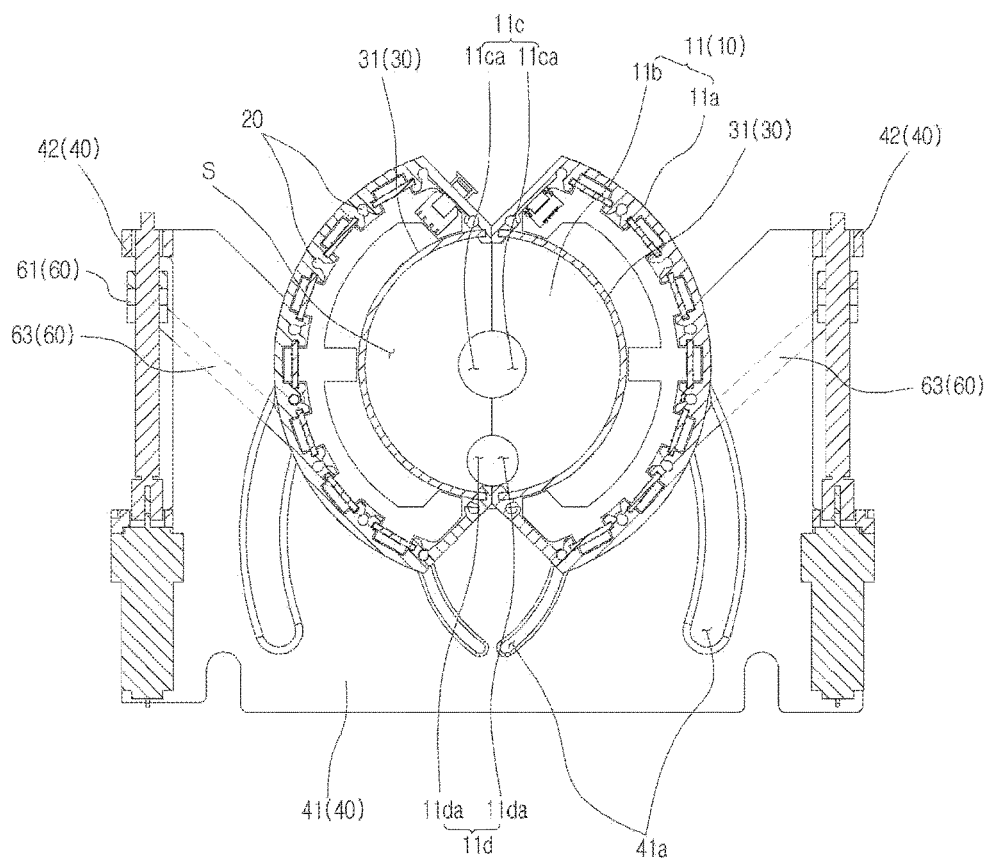
[Fig. 13]
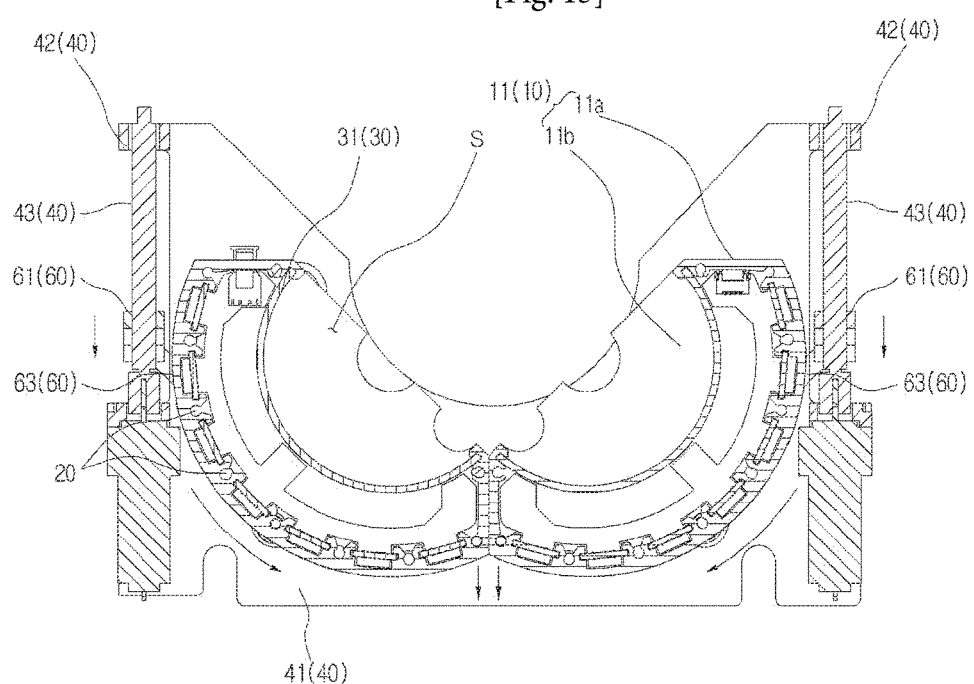

[Fig. 14]
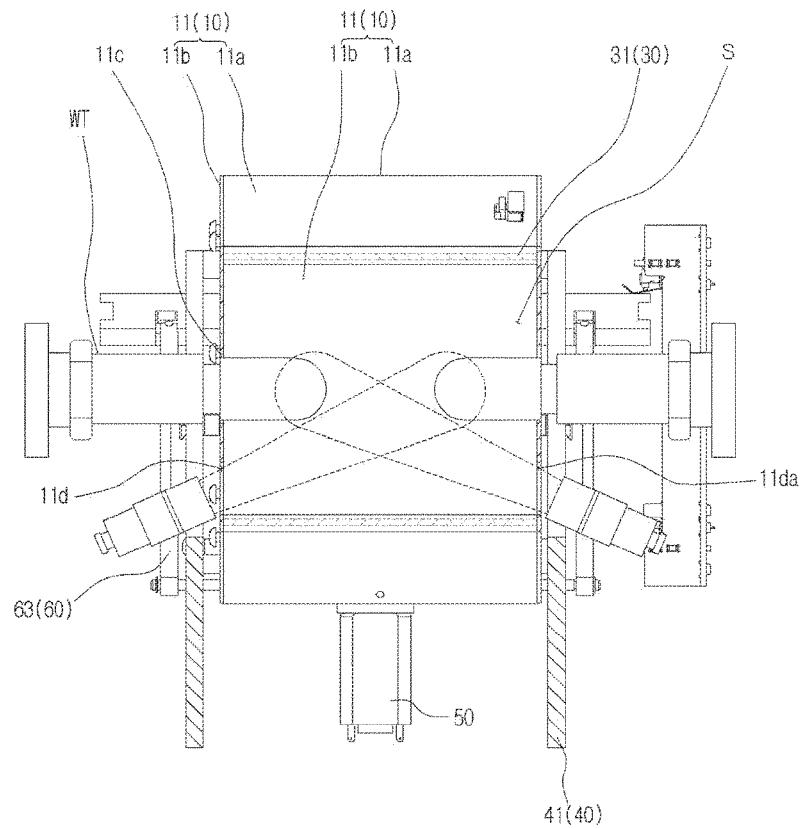
[Fig. 15]
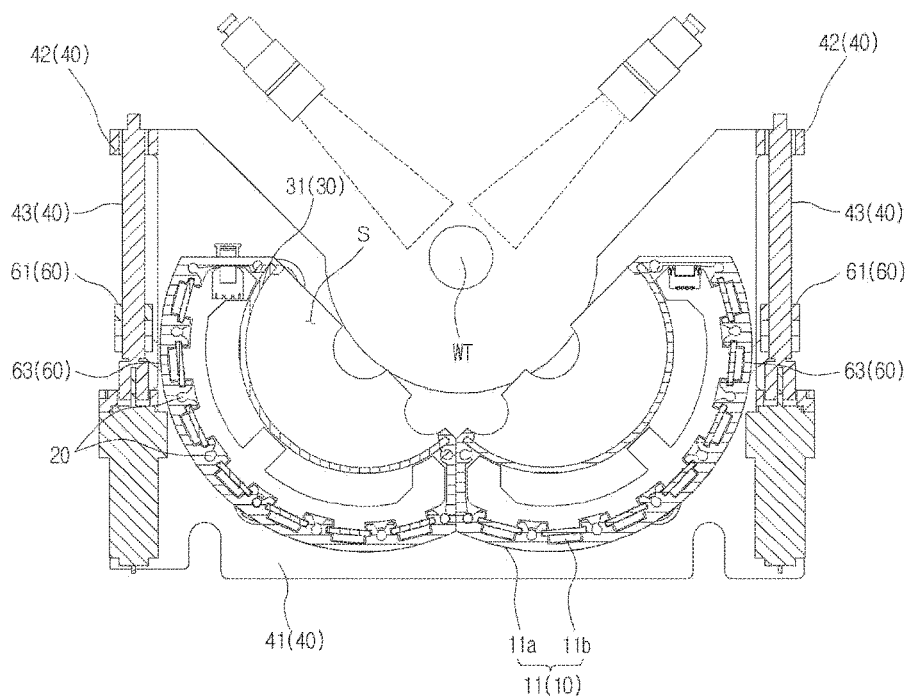

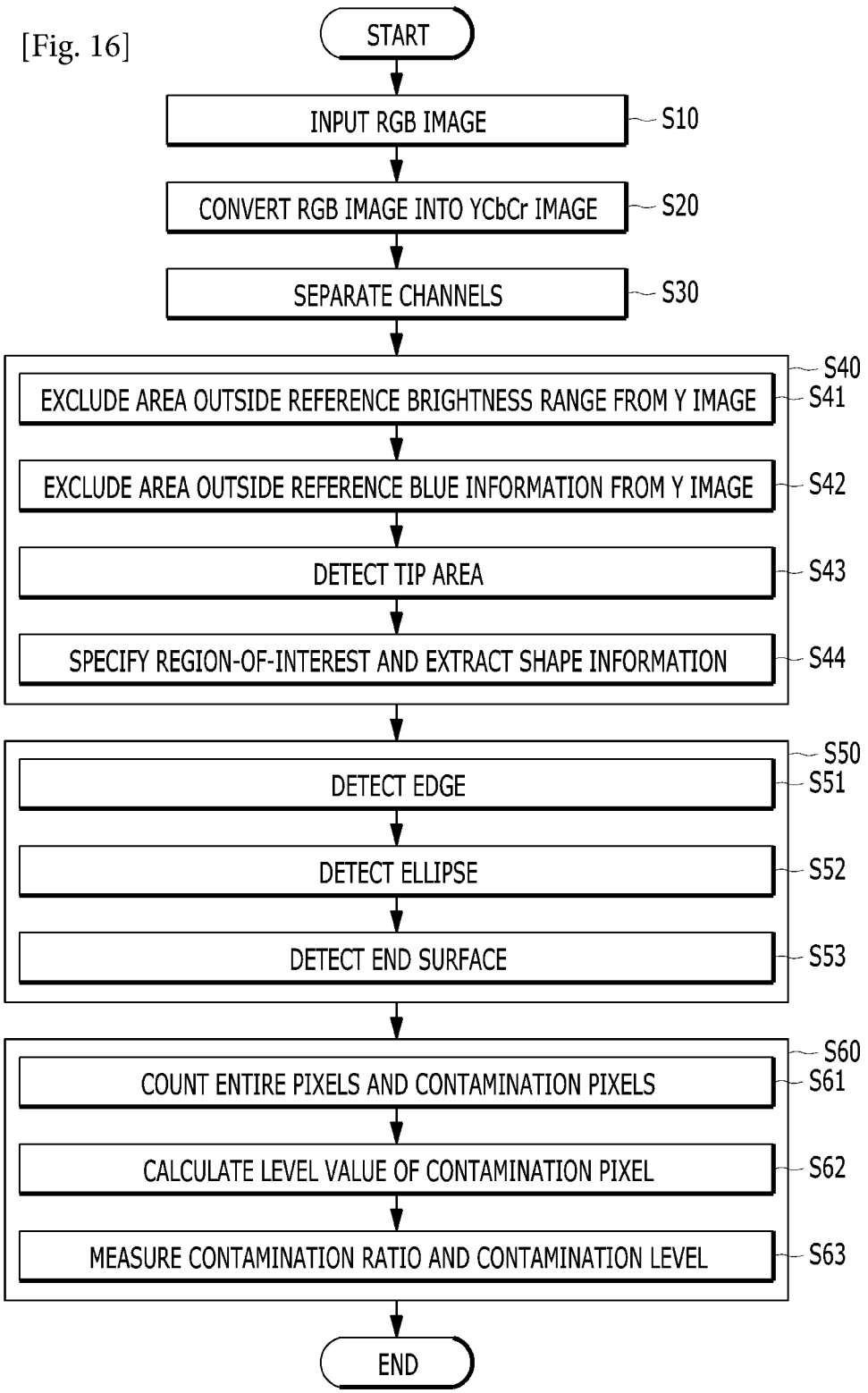

[Fig. 17]
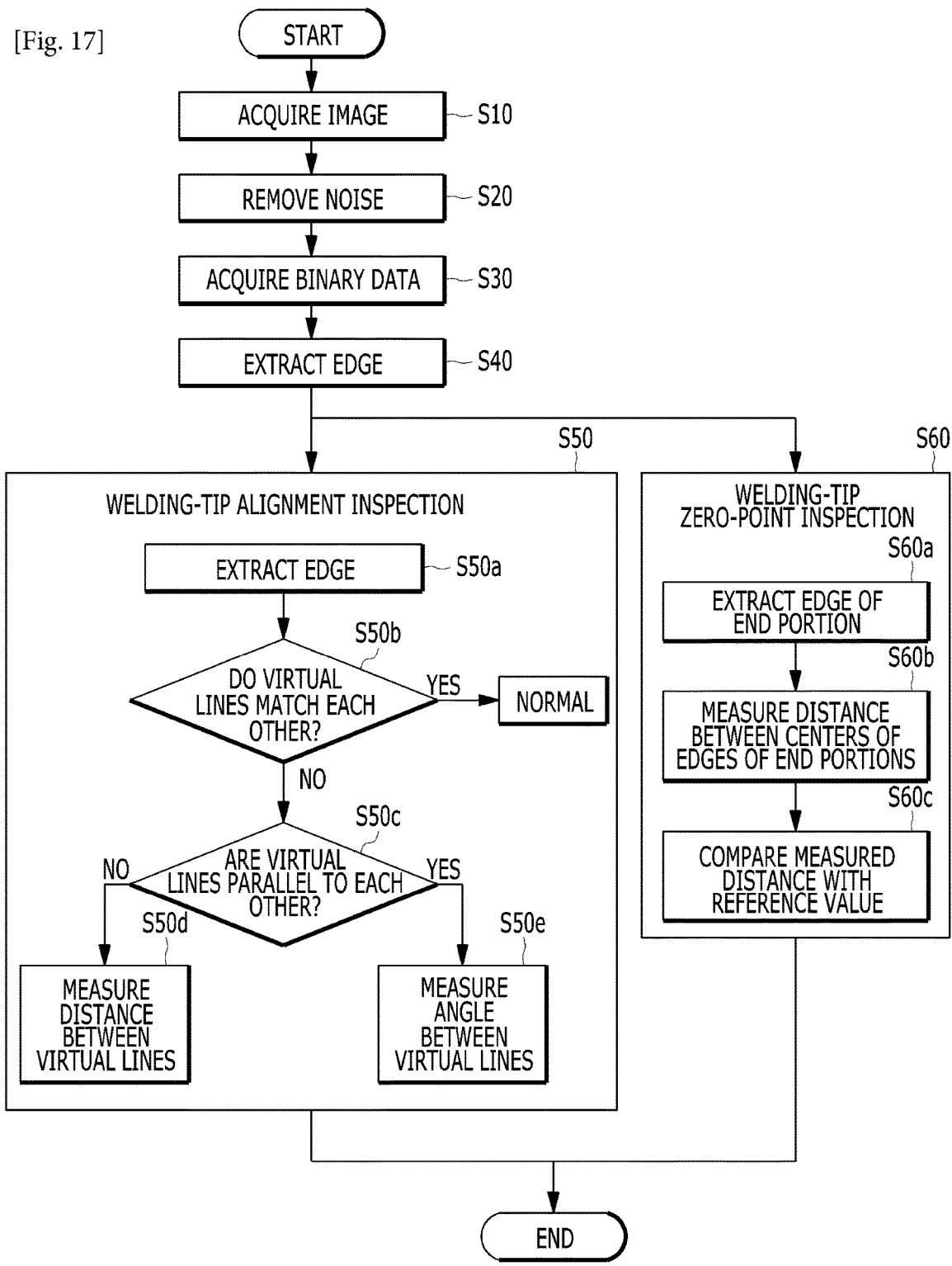

INSPECTION APPARATUS FOR WELDING TIP OF SPOT WELDING GUN AND ANALYSIS METHOD FOR POLLUTION AND ARRAY OF WELDING TIP USING THE SAME

TECHNICAL FIELD

The present invention relates to an apparatus for inspecting a welding tip of a spot welding gun and methods of analyzing conditions of the welding tip by using the apparatus, and more particularly, methods and apparatus for increasing inspection efficiency and reducing time for analyzing an image when inspecting contamination and alignment of the welding tip of the spot welding gun.

This application is based upon and claims the benefit of priority from Korea Patent Application No. 10-2014-0169490, filed Dec. 1, 2014, Korea Patent Application No. 10-2014-0169492, filed Dec. 1, 2014, Korea Patent Application No. 10-2015-0053299, filed Apr. 15, 2015, Korea Patent Application No. 10-2015-00662850, filed May 6, 2015, and Korea Patent Application No. 10-2015-0116864, filed Aug. 19, 2015, the entire contents of which are incorporated herein by reference.

BACKGROUND

In general, a spot welding is a sort of resistance welding technology, which is a method of welding metal plates based on a resistance heat generated by, in a state in which two or three metal plates to be welded are stacked and arranged between a pair of welding tips, pressing the stacked metal plates with the pair of welding tips and applying a current across the welding tips.

This spot welding is also referred to as a point welding, and is widely used for a thin plate welding for its advantage over other methods, which includes a short welding time.

A spot welding gun for the spot welding includes a pair of welding tips facing each other, and welds the metal plates by using a high-temperature heat generated by, in a state in which the welding tips are respectively brought into contact with top and bottom surfaces of the stacked metal plates, applying a high current across the welding tips. In recent years, a welding robot is widely used to perform a welding operation in an automated manner, which includes a robot arm equipped with the spot welding gun.

However, such a spot welding gun can cause a setting error in settings of welding force of the welding tip, current intensity, alignment (straightness), end diameter, zero point of the welding tips, and the like when performing the welding operation, wearing or shape alteration of the welding tip due to a long welding operation, electrode damage due to contamination on the welding tip, and a welding defect including degradation of quality, degradation of strength, internal crack, and the like.

In a conventional system, to cope with the above-mentioned problems, the welding force of the welding tip, the current intensity, and the like are inspected before starting the welding operation using the spot welding gun, and an operator inspects the straightness in visual contact, the end diameter, and the zero point of the welding tip, existence of foreign matter on the welding tip, and the like before starting the welding operation.

However, the operator's visual inspection of the straightness, the end diameter, and the zero point of the welding tip, existence of foreign matter on the welding tip, and the like takes a considerable time and causes a problem of reliability in inspecting the items.

In recent years, as described in Korea Patent No. 1,385,922, an inspection apparatus has been developed, which automatically performs an inspection of the end of the welding tip by using a vision device or automatically inspects the alignment (straightness) of the welding tip by using a sensor.

However, such a welding tip inspection apparatus offers only a single inspection process in a single unit of inspection apparatus, which necessitates the spot welding gun to be moved to another inspection apparatus to perform the next inspection after each inspection process, causing a limit in reduction of the inspection operation. Further, in the case of the vision inspection, a noise is likely to be generated in an image due to exposure of the welding tip to external light, and hence not only the time for analyzing the image is increased but also the inspection efficiency is degraded.

DISCLOSURE

Technical Problem

The present invention has been made in view of the above aspects, and it is an object of the present invention to provide a method and apparatus for inspecting a welding tip, which is capable of increasing the inspection efficiency based on an image analysis and reducing the time for analyzing the image when inspecting the contamination, the alignment, and the like of the welding tip of the spot welding gun.

SUMMARY

In order to achieve the above-mentioned technical object, an apparatus for inspecting a welding tip of a spot welding gun according to some embodiments of the present invention includes an external housing including an internal space therein and an external inlet configured to allow each of a pair of welding tips facing each other to be inserted into the internal space, an internal housing arranged in the internal space of the external housing and including a first internal inlet formed on a first side of opposing sides facing each other and configured to allow a first welding tip of the pair of welding tips inserted from the external inlet on one side to be inserted, a second internal inlet formed on a second side of the opposing sides and configured to allow a second welding tip of the pair of welding tips inserted from the external inlet on the other side to be inserted, and a first monitoring hole and a second monitoring hole respectively arranged close to the first internal inlet and the second internal inlet, a lighting unit configured to provide light to an inspection space defined by the internal housing, a camera unit arranged on the external housing and configured to record the pair of welding tips inserted into the inspection space and to acquire images of the pair of welding tips, and a control unit configured to receive the images of the pair of welding tips from the camera unit and to analyze a state of the welding tips by analyzing the images.

The apparatus for inspecting a welding tip of a spot welding gun according to some embodiments of the present invention further includes a light diffusing unit arranged being separated from an inner surface of the internal housing toward a center of the internal housing by a predetermined distance and configured to diffuse the light provided to the inspection space. The light diffusing unit includes translucent white glass material or synthetic resin material.

According to some embodiments of the present invention, the lighting unit includes a light source including a plurality of light emitting diodes.

According to some embodiments of the present invention, the lighting unit includes a light source and at least one optical fiber including a first facet coupled to the light source and a second facet arranged toward the inspection space.

According to some embodiments of the present invention, the internal housing includes a pair of half bodies formed in a symmetric manner with each other, each of the half bodies includes an opened side, the opened sides of the half bodies are configured to be engaged with each other to define the inspection space, and the half bodies are configured to outwardly rotate with respect to a predetermined point where the half bodies are brought into contact with each other, to open the inspection space.

The apparatus for inspecting a welding tip of a spot welding gun according to some embodiments of the present invention further includes a light diffusing unit including symmetric members, arranged being separated from an inner surface of the internal housing toward a center of the internal housing by a predetermined distance and when the half bodies are engaged with each other, configured to define the inspection space connected to the internal inlets and the monitoring holes and to diffuse the light provided to the inspection space.

The apparatus for inspecting a welding tip of a spot welding gun according to some embodiments of the present invention further includes a support frame arranged on an outer side of the internal housing, a pair of rotation-force providing units arranged on respective sides of the support frame facing each other, and a pair of opening and closing units coupled between the respective rotation-force providing units and the respective half bodies, and configured to receive rotation forces from the respective rotation-force providing units, to rotate the respective half bodies, and to open and close the internal housing.

According to some embodiments of the present invention, the support frame includes a pair of support plates arranged on respective sides of the internal housing in a manner that the support plates facing each other, and each including guide holes formed in a symmetric manner on an outer side, the guide holes engaged with the respective half bodies and formed in an inwardly curved manner, a plurality of connecting bars configured to connect the support plates, and at least one guide bar vertically arranged between the connecting bars, and the opening and closing unit includes a vertical moving bar including a first side movably connected to the guide bar, a vertical moving-force providing bar including a first end connected to the rotation-force providing unit and a second end coupled to a second side of the vertical moving bar in a screwed manner to move up and down the vertical moving bar with rotation of the rotation-force providing unit, and a pair of opening and closing bars each including a first end rotatably connected to the vertical moving-force providing bar and a second end connected to one side of each of the half bodies through the guide hole, and when the vertical moving bar moves up and down, moving along the guide hole to rotate each of the half bodies, thus opening and closing the internal housing.

The apparatus for inspecting a welding tip of a spot welding gun according to some embodiments of the present invention further includes an upper sensor arranged at a closing position of the opening and closing unit where the internal housing is closed and configured to be short-circuited by the opening and closing unit to cut off a current with which the opening and closing unit rotates the rotation-force providing unit in a direction of closing the internal housing and a lower sensor arranged at an opening position of the opening and closing unit where the internal housing is opened and configured to be short-circuited by the opening and closing unit to cut off a current with which the opening and closing unit rotates the rotation-force providing unit in a direction of opening the internal housing.

According to some embodiments of the present invention, the camera unit includes a first end-surface recording camera arranged at a position close to a second end of the external inlet with a recording direction set to record an end surface of the first welding tip through the first monitoring hole and a second end-surface recording camera arranged at a position close to a first end of the external inlet with a recording direction set to record an end surface of the second welding tip through the second monitoring hole. The control unit is configured to analyze a contamination level of the welding tip based on images of end surfaces of the welding tips received from the first end-surface recording camera and the second end-surface recording camera.

According to some embodiments of the present invention, the camera unit includes a first alignment inspection camera arranged on the external housing and configured to acquire a first profile image of the pair of the welding tips and a second alignment inspection camera arranged on the external housing and configured to acquire a second profile image of the pair of welding tips. The control unit is configured to analyze the alignment of the welding tips based on the profile images of the pair of welding tips received from the first alignment inspection camera and the second alignment inspection camera.

According to some embodiments of the present invention, the internal housing includes a pair of half bodies formed in a symmetric manner with each other, each of the half bodies including an opened side, the opened sides of the half bodies configured to be engaged with each other to define the inspection space, the half bodies configured to outwardly rotate with respect to a predetermined point where the half bodies are brought into contact with each other, to open the inspection space, the apparatus further comprises a light diffusing unit including symmetric members, arranged being separated from an inner surface of the internal housing toward a center of the internal housing by a predetermined distance and when the half bodies are engaged with each other, configured to define the inspection space connected to the internal inlets and the monitoring holes and to diffuse the light provided to the inspection space, and the first alignment inspection camera and the second alignment inspection camera are configured to record profile images of the pair of welding tips with the light diffusing unit on a background in a state in which the pair of half bodies rotate outwardly to open the inspection space.

According to some embodiments of the present invention, the first alignment inspection camera and the second alignment inspection camera are arranged with recording directions thereof perpendicular to each other.

The apparatus for inspecting a welding tip of a spot welding gun according to some embodiments of the present invention further includes a welding-force detecting unit arranged on one side of the external housing and configured to be electrically connected to the control unit and to detect a welding force generated by pressing of the pair of welding tips.

The apparatus for inspecting a welding tip of a spot welding gun according to some embodiments of the present invention further includes a current detecting unit arranged on one side of the external housing and configured to be electrically connected to the control unit and to detect amount of a current from a magnetic field generated from the pair of welding tips.

In order to achieve the above-mentioned object, a method of analyzing contamination of a welding tip of a spot welding gun based on an image of a distal end of the welding tip by using a welding-tip inspecting apparatus including an external housing, an internal housing, a lighting unit, a camera unit, and a control unit, according to some embodiments of the present invention includes, by the control unit, (a) receiving a YCbCr image containing brightness information, blue information, and red information on a distal end of the welding tip, (b) separating the YCbCr image into a Y image containing the brightness information, a Cb image containing the brightness information and the blue information, and a Cr image containing the brightness information and the red information, (c) detecting a tip area by extracting an area corresponding to predetermined tip color information from the YCbCr image and specifying the tip area as a region-of-interest, (d) detecting an end surface of the welding tip based on a difference in brightness between pixels in an area corresponding to the region-of-interest in the Y image, and (e) measuring a contamination level of the end surface by comparing color information of each pixel in the end surface with predetermined reference color information.

According to some embodiments of the present invention, the step (c) includes a brightness filtering step of detecting a pixel out of a predetermined reference brightness range from the YCbCr image and excluding a detected pixel from the tip area, a blue filtering step of detecting a pixel out of a predetermined reference blue range from the YCbCr image and excluding a detected pixel from the tip area, a tip-area detecting step of detecting, as the tip area, an area corresponding to a reference red range from the YCbCr image on which the brightness filtering step and the blue filtering step have been performed, a separating step of separating the tip area and the other area from the YCbCr image, a specifying step of specifying an image corresponding to the tip area as a region-of-interest, and a shape-information extracting step of extracting shape information of the region-of-interest.

According to some embodiments of the present invention, the step (d) includes an edge detecting step of detecting an edge of the welding tip based on a difference in brightness between pixels located in an area corresponding to the region-of-interest in the Y image and an ellipse detecting step of detecting an ellipse based on the detected edge information and the shape information of the tip area. In addition, the step (d) further includes an end-surface determining step of detecting a plurality of ellipses in the ellipse detecting step and determining, as the end surface, an ellipse with a diameter of each detected ellipse and a height ratio of each detected tip area within a tolerance in comparing the height ratio of each detected tip area with a predetermined reference ratio.

According to some embodiments of the present invention, the step (e) includes a pixel counting step of counting a total number of pixels in an area corresponding to the end surface in an image of the tip area, a contamination-pixel counting step of determining, as a contamination pixel, a pixel having color information different from a color of the tip area among pixels of an area corresponding to the end surface, and a contamination-level measuring step of calculating a contamination ratio based on the pixels of the area corresponding to the end surface and the contamination pixel and measuring a contamination level of the welding tip based on a color information level of the contamination pixel calculated by comparing color information of the contamination pixel in the YCbCr image with predetermined color information.

In order to achieve the above-mentioned object, a method of analyzing alignment of a welding tip of a spot welding gun based on a profile image of the welding tip by using a welding-tip inspecting apparatus including an external housing, an internal housing, a lighting unit, a camera unit, and a control unit, according to some embodiments of the present invention includes, by the control unit, (a) acquiring a first profile image and a second profile image of a pair of welding tips facing each other, (b) removing noise from the first profile image and the second profile image, (c) acquiring first profile binary data and second profile binary data by binarizing the first profile image and the second profile image based on a predetermined reference value, (d) extracting edges of the pair of welding tips based on the first profile binary data and the second profile binary data, and (e) inspecting the alignment of the pair of welding tips based on whether or not a pair of virtual lines extended from respective side edges of the welding tips match each other.

According to some embodiments of the present invention, the step (e) includes a step of extending a straight virtual line from a side edge of each welding tip among the extracted edges of the pair of welding tips in a direction to the opposing welding tip, a step of determining whether or not the pair of virtual lines extended from the side edges of the respective welding tips, a step of determining, when the pair of virtual lines extended from the side edges of the respective welding tips do not match each other, whether or not the pair of virtual lines are parallel to each other, and a step of measuring a distance between the virtual lines when the virtual lines are parallel to each other and measuring an angle between the virtual lines when the virtual lines are not parallel to each other.

The method of analyzing alignment of a welding tip of a spot welding gun according to some embodiments of the present invention further includes (f) inspecting a zero point of the pair of welding tips by measuring a distance between centers of edges of the distal ends of the pair of welding tips and comparing a measured distance value with a predetermined reference value.

Advantageous Effects

According to some embodiments of the present invention, by recording an image of a welding tip in a darkroom and displaying a clearer outline of the welding tip in the recorded image, not only the efficiency of inspecting the welding tip based on an analysis of the image can be considerably improved but also the time required to analyze the image can be remarkably shortened. In particular, by blocking an interference of external lighting at the time of recording an image of the welding tip, a recorded image free of noise can be acquired, and hence the time required to analyze the image can be remarkably shortened and the inspection efficiency can be improved. Further, by evenly providing the light to the inspection space instead of concentrating the light on the welding tip at the time of recording an image of the welding tip, a clearer image of the distal end of the welding tip can be acquired, and hence the accuracy and the efficiency can be improved in the inspection of the contamination of the distal end of the welding tip. In addition, by forming a white background around the welding tip by using a diffusion filter at the time of recording an image of the welding tip, the light diffused by the diffusion filter and provided to the inspection space forms a white background around the welding tip at the time of recording an image of the welding tip, and hence a profile image of the welding tip with a clearer outline can be acquired, and the accuracy and the efficiency can be improved in a test of alignment (straightness) of the welding tip.

According to some embodiments of the present invention, an RGB image is converted into a YCbCr image containing brightness, blue information, and red information, an area of a spot welding electrode tip is limited, and the end surface of the spot welding electrode tip is detected from the limited area and the contamination of the end surface is measured, by which an operation speed is greatly increased and the operability is remarkably improved.

According to some embodiments of the present invention, edges of the welding tips are extracted by binarizing profile images of a pair of welding tips and then the alignment (straightness) and the zero point of the pair of welding tips are inspected by using the extracted edges of the welding tips, and hence a plurality of welding tips can be batch processed at a single apparatus, which remarkably reduces the inspection time and greatly improves the reliability of the inspection result.

According to some embodiments of the present invention, a welding-force sensor and a current sensor are further provided on one side of the external housing to enable the inspection process for a plurality of welding tips to be performed by a single apparatus, and hence the time required for the welding-tip inspection process can be remarkably shortened.

BRIEF DESCRIPTION OF DRAWINGS

The above and other objects, features, advantages and technical and industrial significance of this invention will be better understood by reading the following detailed description of exemplary embodiments of the invention, when considered in connection with the accompanying drawings. Therefore, the accompanying drawings merely instantiate the exemplary embodiments of the present invention, and the present invention should not be construed as being limited to the contents of the drawings.

FIG. 1 is a perspective view of an apparatus for inspecting a welding tip of a spot welding gun according to some embodiments of the present invention.

FIG. 2 is a front view of the apparatus for inspecting a welding tip of a spot welding gun according to some embodiments of the present invention.

FIG. 3 is a right side view of the apparatus for inspecting a welding tip of a spot welding gun according to some embodiments of the present invention.

FIG. 4 is a left side view of the apparatus for inspecting a welding tip of a spot welding gun according to some embodiments of the present invention.

FIG. 5 is a plan view of the apparatus for inspecting a welding tip of a spot welding gun according to some embodiments of the present invention.

FIG. 6 is a bottom view of the apparatus for inspecting a welding tip of a spot welding gun according to some embodiments of the present invention.

FIG. 7 is a perspective view of an internal housing and a lighting unit according to some embodiments of the present invention.

FIG. 8 is a front view of the internal housing and the lighting unit according to some embodiments of the present invention.

FIG. 9 is a side view of the internal housing and the lighting unit according to some embodiments of the present invention.

FIG. 10 is a schematic diagram for illustrating operation of an upper sensor unit according to some embodiments of the present invention.

FIG. 11 is a schematic diagram for illustrating operation of a lower sensor unit according to some embodiments of the present invention.

FIGS. 12 and 13 are schematic diagrams for illustrating opening and closing operation of the internal housing according to some embodiments of the present invention.

FIG. 14 is a schematic diagram for illustrating a state of recording a distal end image of the welding tip according to some embodiments of the present invention.

FIG. 15 is a schematic diagram for illustrating a state of recording a side image of the welding tip according to some embodiments of the present invention.

FIG. 16 is a flowchart of a method of analyzing contamination of the welding tip according to some embodiments of the present invention.

FIG. 17 is a flowchart of a method of analyzing alignment of the welding tip according to some embodiments of the present invention.

DETAILED DESCRIPTION

Hereinafter, at least one embodiment of the present invention will be described in detail with reference to the accompanying drawings. In the following description, like reference numerals designate like elements, although the elements are shown in different drawings. In the following description, usage of suffixes such as 'module', 'part' or 'unit' used for referring to elements given merely to facilitate explanation of the present invention, without having any significant meaning by itself. In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings. The present invention can be applied with various modifications and have various modes, and hence specific embodiments are instantiated on the drawings and described in detail in the specification. However, this does not intend to limit the present invention to specific embodiments, by should be understood to include all modifications, equivalents, and substitutes within the gist or idea of the disclosure and the technical range of the disclosure.

Terms used herein are for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, and/or groups thereof, but do not preclude the presence or addition of one or more other features, numbers, steps, operations, elements, components, and/or groups thereof.

Terms such as first and second, which may be used to describe various components, should not be interpreted as limiting said components. The above terms are used only to distinguish one of the components from the others.

If a component were described as 'connected', 'coupled', or 'linked' to another component, they may mean the components are not only directly 'connected', 'coupled', or 'linked' but also are indirectly 'connected', 'coupled', or 'linked' via one or more additional components. On the other hand, if a component were described as "directly connected", "directly coupled", or "directly linked" to another component, it should be understood that there is no additional component therebetween.

Further, the singular form includes the plural form unless the context clearly indicates otherwise.

Throughout the specification, it will be further understood that the terms "comprises" and/or "comprising" specify the presence of stated features, numbers, steps, operations, elements, components, and/or combinations thereof, but do not preclude the presence or addition of one or more other features, numbers, steps, operations, elements, components, and/or combinations thereof.

FIG. 1 is a perspective view of an apparatus for inspecting a welding tip of a spot welding gun according to some embodiments of the present invention; FIG. 2 is a front view of the apparatus for inspecting a welding tip of a spot welding gun according to some embodiments of the present invention; FIG. 3 is a right side view of the apparatus for inspecting a welding tip of a spot welding gun according to some embodiments of the present invention; FIG. 4 is a left side view of the apparatus for inspecting a welding tip of a spot welding gun according to some embodiments of the present invention; FIG. 5 is a plan view of the apparatus for inspecting a welding tip of a spot welding gun according to some embodiments of the present invention; and FIG. 6 is a bottom view of the apparatus for inspecting a welding tip of a spot welding gun according to some embodiments of the present invention.

As shown in FIGS. 1 to 6, an apparatus for inspecting a welding tip of a spot welding gun (hereinafter, an "inspection apparatus") includes an external housing 1, an internal housing 10, a lighting unit 20, a camera unit 80, and a control unit 90.

The external housing 1 has an approximately hexahedral box shape, and includes an internal space for accommodating the internal housing therein. The external housing 1 further includes an external inlet 2 on each side, which allows a respective one of a pair of welding tips facing each other to be inserted into the internal space.

The external housing 1 provides an area for installing each component that will be described later, and provides an inspection space as a darkroom, which will be described later, together with the internal housing 10, to allow an outline of the welding tip to clearly appear on a recorded image of the welding dip.

According to some embodiments of the present invention, the external inlet 2 includes a shielding member (not shown). The shielding member includes a soft material and shields the external inlet 2 of the external housing 1 to make the inspection space the darkroom as dark as possible. Further, when the welding tip is inserted, the shielding member is bent to provide an inserting path for the welding tip. For example, the shielding member includes a brush.

FIG. 7 is a perspective view of an internal housing and a lighting unit according to some embodiments of the present invention; FIG. 8 is a front view of the internal housing and the lighting unit according to some embodiments of the present invention; and FIG. 9 is a side view of the internal housing and the lighting unit according to some embodiments of the present invention.

The internal housing 10 is installed in the internal space of the external housing 1. The internal housing 10 includes a first internal inlet 11c that allows a first welding tip of a pair of welding tips to be inserted on one of the end sides facing each other and a second internal inlet (not shown) that allows a second welding tip of the pair of welding tips to be inserted on the other of the end sides facing each other. The internal housing 10 further includes a first monitoring hole 11d and a second monitoring hole (not shown) arranged close to the first internal inlet 11c and the second internal inlet (not shown), respectively.

According to some embodiments of the present invention, the internal housing 10 includes a pair of half bodies 11 formed in a symmetric form to each other.

Each of the half bodies 11 includes a body plate 11a and a pair of side plates 11b. The body plate 11a is formed by folding both ends of a semicircular shape making a predetermined angle toward the center of the arc, such that a cross-sectional shape of the body plate 11a defines a substantially fan shape. Each of the side plates 11b is formed in a fan shape corresponding to the cross-sectional shape of the body plate 11a, so that the pair of side plates 11b shields respective sides of the body plate 11a.

With the body plate 11a and the pair of side plates 11b engaged with each other, the half bodies 11 form a shielded inspection space S therein. An upper portion of the shielded inspection space S is opened when each body plate 11a rotates outwardly with lower ends of the body plates 11a having contact with each other.

Each of the half bodies 11 includes an internal insertion groove 11ca on one side of the center of the side plate 11b where the side plates 11b are brought into contact with each other and a monitoring groove 11da on one side of a lower portion of the side plate 11b where the side plates 11b are brought into contact with each other.

When the half bodies 11 are engaged with each other, this allows the internal insertion grooves 11ca of the side plates 11b to be brought into contact with each other to define the inlet 11c for inserting a pair of welding tips at centers of the respective sides of the internal housing 10 facing each other, and the monitoring grooves 11da of the side plates 11b to be brought into contact with each other to define a monitoring hole 11d for providing a view of a camera for recording images of the distal ends of the pair of welding tips inserted into the inspection space S on lower portions of the sides of the internal housing 10 facing each other.

With this configuration, when the half bodies 11 are engaged with each other, the internal housing 10 allows the pair of welding tips to be inserted into the shielded inspection space S through the respective internal inlet 11c, and the images of the distal ends of the pair of welding tips inserted into the inspection space S to be recorded through the respective monitoring holes 11d.

This allows the internal housing 10 to prevent the shielded inspection space S from being interfered by an external light source (lighting). Therefore, when recording the images of the distal ends of the pair of welding tips, the noise due to the interference of the external light source (lighting) can be prevented from being generated, which enables clearer images of the distal ends of the welding tips to be acquired.

With this configuration, the time required to analyze the images of the distal ends of the welding tips can be considerably shortened and the inspection efficiency can be enhanced.

The lighting unit 20 supplies light in the inspection space S formed by the internal housing 10.

According to some embodiments of the present invention, the lighting unit 20 includes a plurality of light-emitting diodes (LEDs) as a light source. In this case, the LEDs are arranged at regular intervals along an inner circumferential surface of the body plate 11a of each of the half bodies 11.

According to some embodiments of the present invention, the lighting unit 20 includes a light source and at least one optical fiber. The optical fiber includes a first facet coupled to the light source and a second facet arranged toward the inspection space S.

The inspection apparatus 100 according to some embodiments of the present invention further includes a light diffusing unit 30 arranged at a location distant from the inner circumferential surface of the internal housing 10 by a predetermined distance toward the center of the internal housing 10 and configured to diffuse the light illuminated to the inspection space S.

With this configuration, the light from the lighting unit 20 is diffused into the inspection space S not to allow the light to be concentrated on the welding tip but to allow the light to be evenly distributed to the inspection space S to acquire a clearer image of the end of the welding tip.

This enables the operator to visually check contaminants on the end of the welding tip from the acquired image, which improves accuracy and efficiency in the inspection of the contamination on the end of the welding tip.

In some embodiments, the light diffusing unit 30 includes translucent white glass material or synthetic resin material.

On the other hand, when the internal housing 10 includes the pair of half bodies 11, the light diffusing unit 30 is formed in a symmetric shape. Further, the symmetric shape is arranged at a location distance from the inner circumferential surface of the internal housing 10 by a predetermined distance toward the center of the internal housing 10, and when the half bodies 11 are engaged with each other, the inspection space S is formed, which is connected to the inlet 11c and the monitoring hole 11d.

When the internal housing 10 includes the pair of half bodies 11, the inspection apparatus 100 according to some embodiments of the present invention further includes a support frame 40 arranged on an outer side of the internal housing 10, a pair of rotation-force providing units 50 respectively arranged on opposing sides of the support frame 40, and a pair of opening and closing units 60 respectively coupled between the rotation-force providing units 50 and the half bodies 11, receive rotation forces from the rotation-force providing units 50, and rotate the half bodies 11 to open and close the internal housing 10.

The support frame 40 includes a pair of support plates 41, a plurality of connecting bars 42, and at least one guide bar 43. The support plates 41 are arranged facing each other on both sides of the internal housing 10. Each of the support plates 41 includes guide holes 41a in a symmetric manner, formed in an inwardly curved manner to be engaged with the respective half bodies 11. The connecting bars 42 make a connection between the support plates 41. The at least one guide bar 43 is vertically arranged between the connecting bars 42.

The opening and closing unit 60 includes a vertical moving bar 61, a vertical moving-force providing bar 62, and a pair of opening and closing bars 63. The vertical moving bar 61 includes one side movably connected to the guide bar 43. The vertical moving-force providing bar 62 includes one end connected to the rotation-force providing unit 50 and the other end coupled to the other side of the vertical moving bar 61 in a screwed manner to move up and down the vertical moving bar 61 with rotation of the rotation-force providing unit 50. Each of the opening and closing bars 63 includes one end rotatably connected to the vertical moving-force providing bar 62 and the other end connected to one side of each of the half bodies 11 through the guide hole 41a, and when the vertical moving bar 61 moves up and down, moving along the guide hole 41a to rotate each of the half bodies 11, thus opening and closing the internal housing 10.

Each of the rotation-force providing units 50 is arranged between the guide bars 43. A motor can be used as the rotation-force providing unit 50, which is configured to transfer the rotational force to the opening and closing unit 60.

The vertical moving bar 61 is formed in a rod shape having a predetermined length, arranged perpendicular to the guide bar 43 of the support frame 40, and one side thereof is movably connected to the guide bar 43 in a penetrated manner in the vertical direction.

The inspection apparatus 100 according to some embodiments of the present invention further includes an upper sensor 72 arranged at a closing position of the opening and closing unit 60 where the internal housing 10 is closed and a lower sensor 73 arranged at an opening position of the opening and closing unit 60 where the internal housing 10 is opened. The upper sensor 72 is short-circuited by the opening and closing unit 60 to cut off a current with which the opening and closing unit 60 rotates the rotation-force providing unit 50 in a direction of closing the internal housing 10. The lower sensor 73 is short circuited by the opening and closing unit 60 to cut off a current with which the opening and closing unit 60 rotates the rotation-force providing unit 50 in a direction of opening the internal housing 10. Therefore, the upper sensor 72 and the lower sensor 73 stops the operation of the rotation-force providing unit 50 when the opening and closing unit 60 reaches the closing position where the internal housing 10 is closed or the opening position where the internal housing 10 is opened.

In some embodiments, support members 71 are arranged on an outer side of the support frame 40. The upper sensor 72 can be arranged at a position where the vertical moving bar 61 of the opening and closing unit 60 closes the internal housing 10 on one side of the support member 71. The lower sensor 73 can be arranged at a position where the vertical moving bar 61 of the opening and closing unit 60 opens the internal housing 10 on one side of the support member 71.

The support member 71 is arranged vertically on one outer side of the support frame 40 corresponding to one end of the vertical moving bar 61 of the opening and closing unit 60, and provides installation areas for the upper sensor 72 and the lower sensor 73.

The upper sensor 72 includes a first contact 72a arranged at a position on one side of the support member 71 where the vertical moving bar 61 of the opening and closing unit 60 closes the internal housing 10 and a first conductive plate 72b elastically coupled on the other side of the support member 71 and arranged below the first contact 72a with a predetermined interval.

When the vertical moving bar 61 of the opening and closing unit 60 reaches the position where the internal housing 10 is closed, the first contact 72a and the first conductive plate 72b are brought into contact with each other such that the first conductive plate 72b presses against the first contact 72a, by which the upper sensor 72 cuts off the current with which the opening and closing unit 60 rotates the rotation-force providing unit 50 in the direction of closing the internal housing 10.

The lower sensor 73 includes a second contact 73a arranged at a position on one side of the support member 71 where the vertical moving bar 61 of the opening and closing unit 60 opens the internal housing 10 and a second conductive plate 73b elastically coupled on the other side of the support member 71 and arranged over the second contact 73a with a predetermined interval.

When the vertical moving bar 61 of the opening and closing unit 60 reaches the position where the internal housing 10 is opened, the second contact 73a and the second conductive plate 73b are brought into contact with each other such that the second conductive plate 73b presses against the second contact 73a, by which the lower sensor 73 cuts off the current with which the opening and closing unit 60 rotates the rotation-force providing unit 50 in the direction of opening the internal housing 10.

FIG. 10 is a schematic diagram for illustrating operation of an upper sensor unit according to some embodiments of the present invention.

As shown in FIG. 10, at the closing position where the vertical moving bar 61 of the opening and closing unit 60 closes the internal housing 10, the upper sensor 72 cuts off the current with which the opening and closing unit 60 rotates the rotation-force providing unit 50 in the direction of closing the internal housing 10, thus stopping the operation of the rotation-force providing unit 50, by the vertical moving bar 61 of the opening and closing unit 60 presses the first conductive plate 72b such that the first conductive plate 72b is pressed against the first contact 72a.

FIG. 11 is a schematic diagram for illustrating operation of a lower sensor unit according to some embodiments of the present invention.

As shown in FIG. 11, at the opening position where the vertical moving bar 61 of the opening and closing unit 60 opens the internal housing 10, the lower sensor 73 cuts off the current with which the opening and closing unit 60 rotates the rotation-force providing unit 50 in the direction of opening the internal housing 10, thus stopping the operation of the rotation-force providing unit 50, by the vertical moving bar 61 of the opening and closing unit 60 presses the second conductive plate 73b such that the second conductive plate 73b is pressed against the second contact 73a.

In this manner, the upper sensor 72 and the lower sensor 73 can control the operation of the rotation-force providing unit 50 based on hardware. Therefore, when it is not possible to control the operation of the rotation-force providing unit 50 based on software, the upper sensor 72 and the lower sensor 73 take a role of fail-safe that can control the operation of the rotation-force providing unit 50 based on hardware.

FIGS. 12 and 13 are schematic diagrams for illustrating opening and closing operation of the internal housing according to some embodiments of the present invention.

As shown in FIGS. 12 and 13, when the rotation-force providing unit 50 is rotated in a clockwise direction in a state in which the half bodies 11 are coupled to each other to close the internal housing 10, as shown in FIG. 8, the vertical moving-force providing bar 62 coupled to the rotation-force providing unit 50 is rotated in the clockwise direction with the rotation of the rotation-force providing unit 50.

As the vertical moving-force providing bar 62 rotates in the clockwise direction, the vertical moving bar 61 coupled to the vertical moving-force providing bar 62 in a screwed manner moves downward along the guide bar 43.

The opening and closing bar 63 coupled to the vertical moving bar 61 moves downward along the guide hole 41a, by which each of the half bodies 11 rotates outwardly to open an upper portion of the internal housing 10.

The closing operation of the internal housing 10 is performed by a reverse process of the above-mentioned process by way of rotating the rotation-force providing unit 50 in the reverse direction, and hence an explanation thereof is omitted.

Referring back to FIGS. 1 to 6, the camera unit 80 according to some embodiments of the present invention includes a first end-surface recording camera 81 and a second end-surface recording camera 82.

The first end-surface recording camera 81 is arranged at a position close to the other end of the external inlet 2. In this case, a recording direction of the first end-surface recording camera 81 can be set to record the end surface of the first welding tip through the first monitoring hole.

The second end-surface recording camera 82 is arranged at a position close to one end of the external inlet 2. In this case, a recording direction of the second end-surface recording camera 82 can be set to record the end surface of the second welding tip through the second monitoring hole.

The control unit 90 can analyze the contamination of the welding tip based on images of the end surfaces of the welding tips received from the first end-surface recording camera 81 and the second end-surface recording camera 82. A method of analyzing the contamination of the welding tip by the control unit 90 will be described in detail later.

FIG. 14 is a schematic diagram for illustrating a state of recording a distal end image of the welding tip according to some embodiments of the present invention.

As shown in FIG. 14, the inspection apparatus 100 can record the image of the end surface of the welding tip WT through the monitoring hole 11d by using the camera unit 80 in a state in which the lighting unit 20 is turned on after inserting a pair of welding tips WT facing each other into the inspection space S through the internal inlet 11c in a state in which the internal housing 10 is closed.

With this configuration, a noise is prevented from being generated by blocking interference of an external light source (lighting). Further, the light from the lighting unit 20 is diffused by the light diffusing unit 30 to evenly light the inspection space S instead of being concentrated on the end of the welding tip WT, thus preventing the noise from being generated due to the light from the lighting unit 20 reflecting to the camera unit 80 from the end of the welding tip WT.

Therefore, a clearer image of the end of the welding tip WT can be acquired, enabling the operator to visually check contaminants on the end of the welding tip WT from the acquired image, which improves accuracy and efficiency in the inspection of the contamination on the end of the welding tip WT.

Referring back to FIGS. 1 to 6, the camera unit 80 according to some embodiments of the present invention includes a first alignment inspection camera 83 and a second alignment inspection camera 84. The first alignment inspection camera 83 is arranged on the external housing 1, and acquires a first profile image of the pair of the welding tips. The second alignment inspection camera 84 is arranged on the external housing 1, and acquires a second profile image of the pair of welding tips.

The control unit 90 is configured to analyze the alignment of the welding tip based on the profile images of the pair of welding tips received from the first alignment inspection camera 83 and the second alignment inspection camera 84. A method of analyzing the alignment of the welding tip by the control unit 90 will be described in detail later.

The first alignment inspection camera 83 and the second alignment inspection camera 84 can record profile images of the pair of welding tips with the light diffusing unit on the background in a state in which the pair of half bodies 11 rotate outwardly to open the inspection space S.

FIG. 15 is a schematic diagram for illustrating a state of recording a side image of the welding tip according to some embodiments of the present invention.

As shown in FIG. 15, the inspection apparatus 100 according to some embodiments of the present invention can record profile images of the welding tip WT for inspecting the alignment of the welding tip WT by using a camera arranged on a virtual line extending from the bisect point of the body plate 11a of each of the half bodies 11 to the center of the arc in a state in which the internal housing 10 is opened.

The light from the lighting unit 20 is illuminated to a translucent white diffusing filter 31 arranged in each of the half bodies 11, and the translucent white diffusing filter 31 receives the light from the lighting unit 20 and forms a white background around the welding tip WT, by which profile images of the welding tip WT with clearer outline can be acquired.

Therefore, the operator can visually check the outline of the welding tip WT from the acquired profile images of the welding tip WT, which improves accuracy and efficiency in the inspection of the alignment of the welding tip WT.

According to some embodiments of the present invention, the first alignment inspection camera 83 and the second alignment inspection camera 84 are arranged in a manner that a recording direction of the first alignment inspection camera and a recording direction of the second alignment inspection camera are perpendicular to each other. When the recorded profile images of the welding tip WT make a right angle, the accuracy and the efficiency of the alignment test of the welding tip WT are improved.

Referring back to FIGS. 1 to 6, the inspection apparatus 100 according to some embodiments of the present invention further includes a welding-force detecting unit 3 arranged on one side of the external housing 1, electrically connected to the control unit 90, and configured to detect a welding force generated by the pressing of the pair of welding tips.

The welding-force detecting unit 3 can generate the welding force applied from the pair of welding tips as an electrical signal when the welding tips presses on both sides. The welding-force detecting unit 3 transmits the generated electrical signal to the control unit 90. The control unit 90 then measures the welding force of the welding tips based on the electrical signal.

Referring back to FIGS. 1 to 6, the inspection apparatus 100 according to some embodiments of the present invention further includes a current detecting unit 4 arranged on one side of the external housing 1, electrically connected to the control unit 90, and configured to detect the amount of a current from a magnetic field generated from the pair of welding tips.

The current detecting unit 4 is arranged on a side of the external housing 1 other than the side where the welding-force detecting unit 3 is arranged. When a current is applied to the pair of welding tips, the current detecting unit 4 generates the magnetic field generated from the welding tips as an electrical signal. The current detecting unit 4 transfers the generated electrical signal to the control unit 90. The control unit 90 then measures the current value supplied to the pair of welding tips based on the electrical signal.

The control unit 90 receives images of the pair of welding tips from the camera unit 80, and analyzes the images to analyze a state of the welding tips. The control unit 90 is electrically connected to the welding-force detecting unit 3 and the current detecting unit 4, receives the welding force information and the current information of the welding tips from the welding-force detecting unit 3 and the current detecting unit 4, and analyzes the received information. Further, the control unit 90 outputs a control signal to the opening and closing unit 60 to control the opening and closing state of the internal housing 10.

The inspection apparatus 100 according to some embodiments of the present invention further includes a display unit connected to the control unit 90 and configured to display a screen of contents under the inspection or the measurement. The inspection apparatus 100 according to some embodiments of the present invention further includes a communication unit connected to the control unit 90 and configured to transmit data related to the contents under the inspection or the measurement to the outside. The inspection apparatus 100 according to some embodiments of the present invention further includes a memory unit for storing various pieces of data.

A method of analyzing the contamination of the welding tip based on an image obtained by recording the distal end of the welding tip according to some embodiments of the present invention is described below. In the description of the method of analyzing the contamination according to some embodiments of the present invention, a repeated description of each constituent element of the inspection apparatus 100 will be omitted.

FIG. 16 is a flowchart of a method of analyzing contamination of the welding tip according to some embodiments of the present invention.

As shown in FIG. 16, the method of analyzing the contamination of the welding tip according to some embodiments of the present invention includes an image inputting step (Step S10), an image converting step (Step S20), a channel separating step (Step S30), a region-of-interest specifying step (Step S40), an end-surface detecting step (Step S50), and a contamination detecting step (Step S60).

Image Inputting and Image Converting Step (Steps S10 and S20)

The control unit 90 receives an RGB image of the distal end of the welding tip from the camera unit 80 (Step S10). The RGB image contains various pieces of color information, and hence, in order to exclude unnecessary color information in a process of analyzing the contamination of the welding tip, the RGB image is converted into a YCbCr image containing brightness information, blue information, and red information (Step S20).

Although it is described that the RGB image is received and then converted into the YCbCr image in the specification, the present invention is not limited to this scheme, but the YCbCr image can alternatively be received from the camera unit 80.

Channel Separating Step (Step S30)

Thereafter, the control unit 90 detects a tip area based on the brightness information, the blue information, and the red information, and in order to detect the end surface by using only a Y image containing the brightness information, separates the YCbCr image into a Y image containing the brightness information, a Cb image containing the brightness information and the blue information, and a Cr image containing the brightness information and the red information (Step S30).

Region-of-Interest Specifying Step (Step S40)

The control unit 90 detects the tip area by extracting an image corresponding to predetermined tip color information from the YCbCr image, and specifies the detected tip area as a region-of-interest (Step S40).

According to some embodiments of the present invention, the region-of-interest specifying step (Step S40) includes a brightness filtering step, a blue-information filtering step, a tip-area detecting step, a region-of-interest specifying step, and an extracting step.

Firstly, the control unit 90 detects a pixel out of a predetermined reference brightness range from the Y image, and performs the brightness filtering step of excluding the extracted pixel from the tip area (Step S41). The control unit 90 then detects a pixel out of a predetermined reference blue range from the Cb image, and performs the blue filtering step of excluding the extracted pixel from the tip area (Step S42). Steps S10 and S20 can be performed in a reverse order.

Thereafter, the control unit 90 performs the tip-area detecting step of detecting an area of the YCbCr image on which the brightness filtering step and the blue-information filtering step have been performed, which corresponds to a reference red range, as the tip area (Step S43). As copper is generally used as the material for the welding tip, a portion corresponding to the red color in the recorded image corresponds to the welding tip. Therefore, the control unit 90 detects an area corresponding to the predetermined red range from the YCbCr image on which the brightness filtering step and the blue-information filtering step have been performed as the welding tip area.

When the tip area is detected in the above manner, the control unit 90 performs a black-and-white process of processing the tip area and the other area of the YCbCr image as white and black, respectively, thus bisecting the tip area and the other area in the YCbCr image. The control unit 90 then specifies an area corresponding to the tip area as the region-of-interest, and performs the shape-information extracting step of extracting height, center position, and the like of the region-of-interest (Step S44).

End-Surface Detecting Step (Step S50)

The control unit 90 detects the end surface of the welding tip based on a difference in the brightness between pixels in an area corresponding to the region-of-interest in the Y image (Step S50).

According to some embodiments of the present invention, the end-surface detecting step (Step S50) includes an edge detecting step of detecting an edge of the welding tip (Step S51), an ellipse detecting step (Step S52), and an end-surface determining step (Step S53).

Firstly, the control unit 90 performs an edge detecting step of detecting an edge of the welding tip based on a difference in brightness between pixels located in an area corresponding to the region-of-interest in the Y image (Step S51). The edge detecting step can be performed by using a known Canny Edgy detecting method.

The control unit 90 then performs an ellipse detecting step of detecting an ellipse based on the edge information detected at the edge detecting step and the shape information of the tip area (Step S52). When detecting coordinates of each edge pixel in the edge image and detecting an ellipse based on the detected pixel coordinates and the extracted shape information, the ellipse can be detected by using a known Hough based Ellipse detection Algorithm.

Thereafter, the control unit 90 detects a plurality of ellipses in the ellipse detecting step, and performs an end surface determining step of determining an ellipse with a diameter of each detected ellipse and a height ratio of each detected tip area within a tolerance in comparing the height ratio of each detected tip area with a predetermined reference ratio as the end surface (Step S53). In this case, the control unit 90 determines an ellipse having the minimum error among ellipses having the diameter of each detected ellipse and the height ratio of the detected region-of-interest within a tolerance in comparing the height ratio of the detected region-of-interest with the reference ratio as the end surface.

Contamination Detecting Step (Step S60)

The control unit 90 measures the contamination level of the end surface by comparing color information of each pixel in the detected end surface with predetermined reference color information (Step S60).

According to some embodiments of the present invention, the contamination detecting step (Step S60) includes a pixel counting step (Step S61) and contamination detecting steps (Steps S62 and S63).

The control unit 90 counts the total number of pixels located on the inner side of the edge detected from the tip-area detection image, detects black pixels having low brightness among the pixels located in the inner side of the edge as contamination pixels, and counts the number of the contamination pixels (Step S61).

In this case, the control unit 90 extracts coordinate information of the contamination pixel. The control unit 90 then calculates a level value of each contamination pixel by comparing the color information of a pixel located at a position corresponding to the contamination pixel detected from either one of the YCbCr image and the RGB image with predetermined reference color information, i.e., the Munsell color system (Step S62).

Thereafter, the control unit 90 calculates contamination ratio of the end surface of the welding tip by dividing the counted number of contamination pixels by the total number of pixels of the end surface, and measures the contamination level based on the level value of each contamination pixel (Step S63).

A method of analyzing alignment of a welding tip based on a recorded side image of the welding tip according to some embodiments of the present invention is described below. In the description of the method of analyzing the alignment according to some embodiments of the present invention, a repeated description of each constituent element of the inspection apparatus 100 will be omitted.

FIG. 17 is a flowchart of the method of analyzing alignment of the welding tip according to some embodiments of the present invention.

As shown in FIG. 17, the method of analyzing the alignment of the welding tip according to some embodiments of the present invention includes an image acquiring step (Step S10), a noise removing step (Step S20), a binary-data acquiring step (Step S30), an edge extracting step (Step S40), an end-surface detecting step (Step S50), and an alignment inspecting step (Step S60).

Image Acquiring Step (Step S10)

The camera unit 80 acquires the first profile image and the second profile image of the pair of welding tips facing each other, and transfer the first profile image and the second profile image to the control unit 90.

Noise Removing Step (Step S20)

The control unit 90 removes noise from the first profile image and the second profile image. The control unit 90 removes Cb and Cr values from the first profile image and the second profile image, performs a color conversion to a grayscale image, and performs a Gaussian low-pass filtering for the Y signal of the color-converted first and second profile images, thus removing the noise contained in each of the images.

Binary Data Acquiring Step (Step S30)

The control unit 90 binarizes the first profile image and the second profile image based on a predetermined reference value to produce first profile binary data and second profile binary data, respectively. For example, the control unit 90 digitizes an area lower than a predetermined reference value in the first profile image and the second profile image as zero, and maps an area higher than the predetermined reference value to 255, thus acquiring the first profile binary data and the second profile binary data.

Edge Extracting Step (Step S40)

The control unit 90 extracts the edges of the pair of welding tips based on the first profile binary data and the second profile binary data. For example, the control unit 90 extracts an outline portion from the shape of the welding tip, i.e., the edge of the welding tip, by detecting a boundary area between zero and 255 based on planar binary data of the first profile binary data and the second profile binary data.

Welding-Tip Alignment Inspecting Step (Step S50)

The control unit 90 inspects the alignment based on whether or not a pair of virtual lines each extended from a side edge of each welding tip among the extracted edges of the pair of welding tips match each other.

According to some embodiments of the present invention, the welding-tip alignment inspecting step (Step S50) includes a virtual-line extending step (Step S50a), a virtual-line matching determining step (Step S50b), a inter-virtual-line parallelism determining step (Step S50c), an inter-virtual-line distance measuring step (Step S50d), and an inter-virtual-line angle detecting step (Step S50e).

Firstly, the control unit 90 extends a straight virtual line from a side edge of each welding tip among the extracted edges of the pair of welding tips in a direction to the opposing welding tip (Step S50a).

Thereafter, the control unit 90 determines whether or not the pair of virtual lines each extended from the side edge of each welding tip match each other (Step S50b). When the virtual lines match each other, the control unit 90 determines that the welding tips are located on the same line, which is normal.

On the other hand, when the virtual lines to not match each other, the control unit 90 analyzes whether or not the pair of virtual lines are parallel to each other (Step S50c).

When the virtual lines are parallel to each other, the control unit 90 measures a distance between the virtual lines (Step S50d). On the other hand, when the virtual lines are not parallel to each other, the control unit 90 measures an angle between the virtual lines (Step S50e). The measured distance between the virtual lines can be used to improve the alignment of the welding tips. The measured angle between the virtual lines can be used as a rotation angle of the welding tip to improve the straightness of the welding tip.

The method of analyzing the alignment of the welding tip according to some embodiments of the present invention further includes a welding-tip zero-point inspecting step.

Welding-Tip Zero-Point Inspecting Step (Step S60)

After Step S40, the control unit 90 extracts edges of the distal ends from the edges of the pair of welding tips (Step S60a), measures a distance between centers the edges of the distal ends of the pair of welding tips (Step S60b), and compares the measure distance with a predetermined reference value, thus inspecting the zero point of the pair of welding tips (Step S60c).

Although exemplary embodiments of the present invention have been described for illustrative purposes, those skilled in the art will appreciate that various modifications, additions and substitutions are possible, without departing from the idea and scope of the claimed invention. Accordingly, one of ordinary skill would understand the scope of the claimed invention is not to be limited by the explicitly described above embodiments but by the claims and equivalents thereof.

INDUSTRIAL APPLICABILITY

The technology according to the present invention can be appropriately used in overall spot welding gun technology.

The invention claimed is:

1. An apparatus for inspecting a welding tip of a spot welding gun, the apparatus comprising:
    an external housing including
        an internal space therein, and
        an external inlet configured to allow each of a pair of welding tips facing each other to be inserted into the internal space;
    an internal housing arranged in the internal space of the external housing and including
        a first internal inlet formed on a first side of opposing sides facing each other and configured to allow a first welding tip of the pair of welding tips inserted from the external inlet on one side to be inserted,
        a second internal inlet formed on a second side of the opposing sides and configured to allow a second welding tip of the pair of welding tips inserted from the external inlet on the other side to be inserted, and
        a first monitoring hole and a second monitoring hole respectively arranged close to the first internal inlet and the second internal inlet;
    a lighting unit configured to provide light to an inspection space defined by the internal housing;
    a camera unit arranged on the external housing and configured to record the pair of welding tips inserted into the inspection space and to acquire images of the pair of welding tips; and
    a control unit configured to receive the images of the pair of welding tips from the camera unit and to analyze a state of the welding tips by analyzing the images,
    wherein
        the internal housing includes a pair of half bodies formed in a symmetric manner with each other,
        each of the half bodies includes an opened side, the opened sides of the half bodies are configured to be engaged with each other to define the inspection space, and
        the half bodies are configured to outwardly rotate with respect to a predetermined point where the half bodies are brought into contact with each other, to open the inspection space.

2. The apparatus according to claim 1, further comprising a light diffusing unit arranged being separated from an inner surface of the internal housing toward a center of the internal housing by a predetermined distance and configured to diffuse the light provided to the inspection space.

3. The apparatus according to claim 2, wherein the light diffusing unit includes translucent white glass material or synthetic resin material.

4. The apparatus according to claim 1, wherein the lighting unit includes a light source including a plurality of light emitting diodes.

5. The apparatus according to claim 1, wherein the lighting unit includes a light source, and at least one optical fiber including a first facet coupled to the light source and a second facet arranged toward the inspection space.

6. The apparatus according to claim 1, further comprising a light diffusing unit including symmetric members, arranged being separated from an inner surface of the internal housing toward a center of the internal housing by a predetermined distance and when the half bodies are engaged with each other, configured to define the inspection space connected to the internal inlets and the monitoring holes and to diffuse the light provided to the inspection space.

7. The apparatus according to claim 1, further comprising:
a support frame arranged on an outer side of the internal housing;
a pair of rotation-force providing units arranged on respective sides of the support frame facing each other; and
a pair of opening and closing units coupled between the respective rotation-force providing units and the respective half bodies, and configured to receive rotation forces from the respective rotation-force providing units, to rotate the respective half bodies, and to open and close the internal housing.

8. The apparatus according to claim 7, wherein
the support frame includes
a pair of support plates arranged on respective sides of the internal housing in a manner that the support plates facing each other, and each including guide holes formed in a symmetric manner on an outer side, the guide holes engaged with the respective half bodies and formed in an inwardly curved manner,
a plurality of connecting bars configured to connect the support plates, and
at least one guide bar vertically arranged between the connecting bars, and
the opening and closing unit includes
a vertical moving bar including a first side movably connected to the guide bar,
a vertical moving-force providing bar including a first end connected to the rotation-force providing unit and a second end coupled to a second side of the vertical moving bar in a screwed manner to move up and down the vertical moving bar with rotation of the rotation-force providing unit, and
a pair of opening and closing bars each including a first end rotatably connected to the vertical moving-force providing bar and a second end connected to one side of each of the half bodies through the guide hole, and when the vertical moving bar moves up and down, moving along the guide hole to rotate each of the half bodies, thus opening and closing the internal housing.

9. The apparatus according to claim 7, further comprising:
an upper sensor arranged at a closing position of the opening and closing unit where the internal housing is closed and configured to be short-circuited by the opening and closing unit to cut off a current with which the opening and closing unit rotates the rotation-force providing unit in a direction of closing the internal housing, and
a lower sensor arranged at an opening position of the opening and closing unit where the internal housing is opened and configured to be short-circuited by the opening and closing unit to cut off a current with which the opening and closing unit rotates the rotation-force providing unit in a direction of opening the internal housing.

10. The apparatus according to claim 1, wherein
the camera unit includes
a first end-surface recording camera arranged at a position close to a second end of the external inlet with a recording direction set to record an end surface of the first welding tip through the first monitoring hole, and
a second end-surface recording camera arranged at a position close to a first end of the external inlet with a recording direction set to record an end surface of the second welding tip through the second monitoring hole, and
the control unit is configured to analyze a contamination level of the welding tip based on images of end surfaces of the welding tips received from the first end-surface recording camera and the second end-surface recording camera.

11. The apparatus according to claim 1, wherein
the camera unit includes
a first alignment inspection camera arranged on the external housing and configured to acquire a first profile image of the pair of the welding tips, and
a second alignment inspection camera arranged on the external housing and configured to acquire a second profile image of the pair of welding tips, and
the control unit is configured to analyze the alignment of the welding tips based on the profile images of the pair of welding tips received from the first alignment inspection camera and the second alignment inspection camera.

12. The apparatus according to claim 11, further comprising
a light diffusing unit including symmetric members, arranged being separated from an inner surface of the internal housing toward a center of the internal housing by a predetermined distance and when the half bodies are engaged with each other, configured to define the inspection space connected to the internal inlets and the monitoring holes and to diffuse the light provided to the inspection space,
wherein the first alignment inspection camera and the second alignment inspection camera are configured to record profile images of the pair of welding tips with the light diffusing unit on a background in a state in which the pair of half bodies rotate outwardly to open the inspection space.

13. The apparatus according to claim 11, wherein the first alignment inspection camera and the second alignment inspection camera are arranged with recording directions thereof perpendicular to each other.

14. The apparatus according to claim 1, further comprising a welding-force detecting unit arranged on one side of the external housing and configured to be electrically connected to the control unit and to detect a welding force generated by pressing of the pair of welding tips.

15. The apparatus according to claim 1, further comprising a current detecting unit arranged on one side of the external housing and configured to be electrically connected to the control unit and to detect amount of a current from a magnetic field generated from the pair of welding tips.

* * * * *